United States Patent
Lu et al.

(10) Patent No.: US 11,445,556 B2
(45) Date of Patent: Sep. 13, 2022

(54) COMMUNICATIONS METHOD AND APPARATUS

(71) Applicant: Huawei Technologies Co., Ltd., Shenzhen (CN)

(72) Inventors: Wei Lu, Shenzhen (CN); Hualin Zhu, Shanghai (CN); Huan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 16/926,216

(22) Filed: Jul. 10, 2020

(65) Prior Publication Data

US 2020/0344823 A1 Oct. 29, 2020

Related U.S. Application Data

(63) Continuation of application No. PCT/CN2019/088025, filed on May 22, 2019.

(30) Foreign Application Priority Data

Aug. 13, 2018 (CN) .......................... 201810921208.5

(51) Int. Cl.
*H04W 68/00* (2009.01)
*H04W 76/10* (2018.01)
*H04W 48/08* (2009.01)

(52) U.S. Cl.
CPC ........... *H04W 76/10* (2018.02); *H04W 48/08* (2013.01); *H04W 68/005* (2013.01)

(58) Field of Classification Search
CPC ... H04W 76/10; H04W 48/08; H04W 68/005; H04W 68/02; H04W 4/12; H04W 8/20; H04W 76/18
See application file for complete search history.

(56) References Cited

U.S. PATENT DOCUMENTS

2006/0002416 A1   1/2006   Yagihashi
2018/0198867 A1   7/2018   Dao et al.
(Continued)

FOREIGN PATENT DOCUMENTS

CN   101438544 A   5/2009
CN   104602201 A   5/2015
(Continued)

OTHER PUBLICATIONS

Huawei, "Description of Policy Association," 3GPP TSG-SA WG2 Meeting #127, Sanya, China, Apr. 16-20, 2018, S2-184199, 65 pages.
(Continued)

*Primary Examiner* — Joseph E Dean, Jr.
(74) *Attorney, Agent, or Firm* — Conley Rose, P.C.

(57) ABSTRACT

A communications method and apparatus related to the field of communications technologies and includes receiving, by an access and mobility management network element, a first message corresponding to a packet data unit (PDU) session from a session management network element, where the first message includes first information to be sent to a terminal, and where the PDU session is established based on a non-3rd Generation Partnership Project (non-3GPP) access, and sending, by the access and mobility management network element, the first information to the terminal using a 3GPP access.

20 Claims, 11 Drawing Sheets

(56) References Cited

U.S. PATENT DOCUMENTS

| | | | |
|---|---|---|---|
| 2018/0220478 A1 | 8/2018 | Zhu et al. | |
| 2019/0174405 A1* | 6/2019 | Yang | H04W 88/023 |
| 2019/0223152 A1 | 7/2019 | Ke et al. | |
| 2020/0045753 A1* | 2/2020 | Dao | H04W 4/08 |
| 2021/0136858 A1* | 5/2021 | Kawasaki | H04W 76/20 |

FOREIGN PATENT DOCUMENTS

| | | |
|---|---|---|
| CN | 102918915 B | 4/2017 |
| CN | 107371215 A | 11/2017 |
| CN | 107925904 A | 4/2018 |
| CN | 108323245 A | 7/2018 |

OTHER PUBLICATIONS

Ericsson, "Alignment of terminology and general cleanup," 3GPP TSG-SA WG2 Meeting #126, Feb. 26-Mar. 2, 2018, Montreal, Canada, S2-182630, 103 pages.

Qualcomm Incorporated, "TS 23.502: Support of PDU sessions over non-3GPP access for UEs in CM-IDLE state over non-3GPP access," SA WG2 Meeting #121, S2-173131, May 15-19, 2017, Hangzhou, P.R. China, 18 pages.

3GPP TS 23.501 V15.2.0, Jun. 2018, "3rd Generation Partnership Project; Technical Specification Group Services and System Aspects; System Architecture for the 5G System; Stage 2 (Release 15)," 216 pages.

3GPP TS 23.502 V15.2.0, Jun. 2018, "3rd Generation Partnership Project; Technical Specification Group Services and System Aspects; Procedures for the 5G System; Stage 2 (Release 15)," 308 pages.

LG Electronics, "DL signalling handling for non-3GPP PDU Session," 3GPP TSG-SA WG2 Meeting #126, S2-182046, Montreal, Canada, Feb. 26-Mar. 2, 2018, 3 pages.

Nokia et al, "Correction to Service Request QoS when changing between non-3GPP and 3GPP accesses," SA WG2 Meeting #128, S2-186636, Jul. 2-6, 2018, Vilnius, LT, 10 pages.

Huawei, et al., "How to handle the downlink signalling pending over Non-3GPP access," SA WG2 Meeting #128, S2-186768, Vilnius, Lithuania, Jul. 2-Jul. 6, 2018, 4 pages.

Huawei et al., "Handling of downlink NAS signalling for UE in CM-IDLE on Non-3GPP access," 3GPP TSG-SA WG2 Meeting #128, S2-186769, Vilnius, Lithuania, Jul. 2-Jul. 6, 2018, 5 pages.

Nokia et al., "Correction to Service Request QoS when changing between non-3GPP and 3GPP accesses," SA WG2 Meeting #128 ,S2-187049, Jul. 2-6, 2018, Vilnius, LT, 12 pages.

\* cited by examiner

COMMUNICATIONS METHOD AND APPARATUS

CROSS-REFERENCE TO RELATED APPLICATIONS

This application is a continuation of International Patent Application No. PCT/CN2019/088025 filed on May 22, 2019, which claims priority to Chinese Patent Application No. 201810921208.5 filed on Aug. 13, 2018. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

A next generation mobile communications system network architecture, which may also be referred to as a fifth generation (5G) network architecture, not only supports a terminal in accessing a Public Land Mobile Network (PLMN) using a 3rd Generation Partnership Project (3GPP) access, but also supports the terminal in accessing the PLMN using a non-3GPP access. That is, the terminal may establish packet data unit (PDU) sessions separately based on the 3GPP access and the non-3GPP access. However, when a network-side device (namely, a network element in the PLMN) receives a message (or signaling) corresponding to a PDU session that is established based on a non-3GPP access network, and the message carries information to be sent to the terminal, there is no processing solution.

SUMMARY

Embodiments of this application provide a communications method and apparatus, to provide a technical solution to use when a network-side device receives a message (or signaling) corresponding to a PDU session that is established based on a non-3GPP access network, and the message carries information to be sent to a terminal.

According to a first aspect, an embodiment of this application provides a communications method, including receiving, by an access and mobility management network element, a first message corresponding to a PDU session from a session management network element, where the first message includes first information to be sent to a terminal, and the PDU session is a PDU session that is established based on a non-3GPP access, and sending, by the access and mobility management network element, the first information to the terminal using a 3GPP access.

The first message corresponding to the PDU session is a message initiated (or triggered) by the session management network element based on a PDU session processing procedure (for example, a PDU session authorization/authentication procedure, a PDU session release procedure, or a PDU session modification procedure). For example, the first message may be a service operation message based on the PDU session. The service operation message for the PDU session may be an N1N2 signaling transmission message, for example, an Namf_Communication_N1N2MessageTransfer message.

The first information is a type of information to be sent to the terminal, for example, may be N1 information.

This technical solution provides a processing procedure used when the access and mobility management network element receives the message sent by the session management network element and including the first information to be sent to the terminal, and the message is a message corresponding to the PDU session that is established based on the non-3GPP access, and the first information is sent to the terminal using the 3GPP access. In this way, even if the terminal is in an idle state in the non-3GPP access, this technical solution provides a solution for the access and mobility management network element to send information related to the non-3GPP access to the terminal.

In a possible implementation, the first message does not include second information to be sent to an access network device. The second information is a type of information to be sent to the access network device, for example, may be N2 information.

In a possible implementation, the method further includes determining, by the access and mobility management network element, that the terminal is already registered with both the 3GPP access and the non-3GPP access.

In a possible implementation, the method further includes rejecting, by the access and mobility management network element, activation of a user plane of the PDU session. In this way, resource overheads caused by the activation of the user plane of the PDU session can be reduced.

In a possible implementation, the first message further includes first instruction information, and the first instruction information is used to instruct not to activate the user plane of the PDU session, and rejecting, by the access and mobility management network element, activation of a user plane of the PDU session includes rejecting, by the access and mobility management network element, the activation of the user plane of the PDU session based on the first instruction information.

In a possible implementation, the method further includes if the terminal is in the idle state in the non-3GPP access, sending, by the access and mobility management network element, a paging message or a notification message to the terminal using the 3GPP access, receiving, by the access and mobility management network element, a second message from the terminal, where the second message includes second instruction information, and the second instruction information is used to instruct not to activate the user plane of the PDU session, and rejecting, by the access and mobility management network element, the activation of the user plane of the PDU session based on the second instruction information. For example, the second message may be a service request message. The second instruction information may explicitly or implicitly instruct not to activate the user plane of the PDU session.

In a possible implementation, the second instruction information includes the second message does not include a set of PDU sessions allowed by the terminal, or the second message includes a set of PDU sessions allowed by the terminal, and the set of PDU sessions allowed by the terminal is empty. The set of PDU sessions allowed by the terminal is a set of PDU sessions that are established by the terminal using the non-3GPP access and that are allowed by the terminal to be migrated to the 3GPP access. This possible design provides several implementations in which the second instruction information implicitly instructs not to activate the user plane of the PDU session. Certainly, this embodiment of this application is not limited thereto.

In a possible implementation, the paging message or the notification message includes third indication information, and the third indication information is used by the terminal to determine the second instruction information. Certainly, this embodiment of this application also supports a solution in which the paging message or the notification message does not include the third indication information.

In a possible implementation, rejecting, by the access and mobility management network element, activation of a user plane of the PDU session includes sending, by the access and mobility management network element, a third message to the session management network element, where the third message is used to notify the session management network element that the user plane of the PDU session is not activated, or rejecting, by the access and mobility management network element, sending of a message (for example, a PDU session update context request message) to the session management network element, or sending, by the access and mobility management network element, a fourth message to the session management network element, where the fourth message is used to notify the session management network element that the user plane of the PDU session cannot be activated.

In a possible implementation, the method further includes receiving, by the access and mobility management network element, a fifth message from the session management network element, where the fifth message is used to notify the access and mobility management network element that the user plane of the PDU session is not activated. In this possible design, the access and mobility management network element may reject the activation of the user plane of the PDU session.

In a possible implementation, the method further includes sending, by the access and mobility management network element, fourth indication information to the session management network element, where the fourth indication information is used to indicate at least one of the terminal is in the idle state in the non-3GPP access, the terminal is unreachable in the non-3GPP access, access type information corresponding to the first information, or a signaling connection is to be established and no user plane connection is to be established, and the fourth indication information is used by the session management network element to determine the fifth message.

In a possible implementation, the method further includes receiving, by the access and mobility management network element from the session management network element, information about a reason why the user plane of the PDU session is not activated. For example, the information about the reason includes the first information.

In a possible implementation, the method further includes sending, by the access and mobility management network element, access type (which is the non-3GPP access) information corresponding to the first information and/or access type (which is the non-3GPP access) information of the PDU session to the terminal using the 3GPP access.

According to a second aspect, an embodiment of this application provides a communications method, including sending, by a session management network element, a first message corresponding to a PDU session to an access and mobility management network element, where the first message includes first information to be sent to a terminal, and the PDU session is a PDU session that is established based on a non-3GPP access, and rejecting, by the session management network element, activation of a user plane of the PDU session.

In a possible implementation, rejecting, by the session management network element, activation of a user plane of the PDU session includes rejecting, by the session management network element, the activation of the user plane of the PDU session based on the first information.

In a possible implementation, the method further includes receiving, by the session management network element, fourth indication information from the access and mobility management network element, where the fourth indication information is used to indicate at least one of the terminal is in an idle state in the non-3GPP access, the terminal is unreachable in the non-3GPP access, access type information corresponding to the first information, or a signaling connection is to be established and no user plane connection is to be established, and rejecting, by the session management network element, activation of a user plane of the PDU session includes rejecting, by the session management network element, the activation of the user plane of the PDU session based on the fourth indication information.

In a possible implementation, rejecting, by the session management network element, activation of a user plane of the PDU session includes sending, by the session management network element, a fifth message to the access and mobility management network element, where the fifth message is used to notify the access and mobility management network element that the user plane of the PDU session is not activated.

In a possible implementation, the method further includes sending, by the session management network element to the access and mobility management network element, information about a reason why the activation of the user plane of the PDU session is rejected. For example, the information about the reason includes the first information.

According to a third aspect, an embodiment of this application provides a communications method, including sending, by a session management network element, a first message corresponding to a PDU session to an access and mobility management network element, where the first message includes first information to be sent to a terminal, and the PDU session is a PDU session that is established based on a non-3GPP access, and receiving, by the session management network element, a third message or a fourth message from the access and mobility management network element, where the third message is used to notify the session management network element that a user plane of the PDU session is not activated, and the fourth message is used to notify the session management network element that the user plane of the PDU session cannot be activated.

According to a fourth aspect, an embodiment of this application provides a communications method, including when a terminal is in an idle state in a non-3GPP access, receiving, by the terminal, a paging message or a notification message from an access and mobility management network element using a 3GPP access, and sending, by the terminal, a second message to the access and mobility management network element using the 3GPP access, where the second message includes second instruction information, the second instruction information is used to instruct not to activate a user plane of a PDU session, and the PDU session is a PDU session that is established based on the non-3GPP access.

In a possible implementation, the second instruction information includes the second message does not include a set of PDU sessions allowed by the terminal, or the second message includes a set of PDU sessions allowed by the terminal, and the set of PDU sessions allowed by the terminal is empty. The set of PDU sessions allowed by the terminal is a set of PDU sessions that are established by the terminal using the non-3GPP access and that are allowed by the terminal to be migrated to the 3GPP access.

In a possible implementation, the paging message or the notification message includes third indication information, and the method further includes determining, by the terminal, the second instruction information based on the third indication information.

In a possible implementation, the method further includes receiving, by the terminal, access type information corresponding to the first information from the access and mobility management network element using the 3GPP access.

In a possible implementation, the terminal is already registered with both the 3GPP access and the non-3GPP access.

It should be noted that, for explanations and specific implementations of related content such as the first information, the second information, and the first message in any one of the methods according to the second aspect to the fourth aspect, refer to the first aspect. Details are not described herein again.

According to a fifth aspect, an embodiment of this application provides a communications method, including receiving, by an access and mobility management network element, a first message corresponding to a PDU session from a session management network element, where the first message includes first information to be sent to a terminal, and the PDU session is a PDU session that is established based on a non-3GPP access, and when the terminal is in an idle state in the non-3GPP access, storing, by the access and mobility management network element, the first information, when the terminal is in a connected state in the non-3GPP access, sending, by the access and mobility management network element, the first information to the terminal using the non-3GPP access, or when the PDU session is migrated to a 3GPP access, sending, by the access and mobility management network element, the first information to the terminal using the 3GPP access. In this technical solution, when the terminal is in the idle state in the non-3GPP access, the access and mobility management network element may not send a paging message or a notification message to the terminal, but store the first information. In this way, signaling overheads caused by sending of the paging message or the notification message can be reduced.

In a possible implementation, the first message further includes second information to be sent to an access network device.

According to a sixth aspect, an embodiment of this application provides a communications method, including receiving, by an access and mobility management network element, a first message corresponding to a PDU session from a session management network element, where the first message includes first information to be sent to a terminal, and the PDU session is a PDU session that is established based on a non-3GPP access, and rejecting, by the access and mobility management network element, activation of a user plane of the PDU session.

For explanations, specific implementation, beneficial effects, and the like of related content in this technical solution, refer to the first aspect. Details are not described herein again.

According to a seventh aspect, an embodiment of this application provides a communications apparatus. The apparatus may be configured to perform the method according to the first aspect. The apparatus may be the access and mobility management network element according to the first aspect. In an example, the apparatus may be a chip.

In a possible design, functional modules of the apparatus may be obtained through division according to the method according to the first aspect. For example, the functional modules may be obtained through division based on corresponding functions, or two or more functions may be integrated into one processing module.

In a possible design, the apparatus may include a memory and a processor, and the memory is configured to store program code. When the program code is executed by the processor, the method according to the first aspect is performed.

Similarly, an embodiment of this application further provides a communications apparatus configured to perform any one of the methods according to the second aspect to the sixth aspect. For example, if the apparatus is configured to perform the method according to the second aspect or the third aspect, the apparatus may be a session management network element, if the apparatus is configured to perform the method according to the fourth aspect, the apparatus may be a terminal, if the apparatus is configured to perform the method according to the fifth aspect or the sixth aspect, the apparatus may be an access and mobility management network element. In an example, the apparatus may be a chip.

In a possible design, functional modules of the apparatus may be obtained through division according to the method according to the corresponding aspect. For example, the functional modules may be obtained through division based on corresponding functions, or two or more functions may be integrated into one processing module.

In a possible design, the apparatus may include a memory and a processor, and the memory is configured to store program code. When the program code is executed by the processor, the method according to the corresponding aspect is performed.

According to an eighth aspect, an embodiment of this application provides a processing apparatus configured to implement a function of the foregoing communications apparatus. The processing apparatus includes a processor and an interface, and the processing apparatus may be a chip. The processor may be implemented by hardware, or may be implemented by software. When the processor is implemented by the hardware, the processor may be a logic circuit, an integrated circuit, or the like, when the processor is implemented by the software, the processor may be a general-purpose processor, and is implemented by reading software code stored in the memory. The memory may be integrated into the processor, may be located outside the processor, or may exist independently.

An embodiment of this application further provides a computer-readable storage medium. The computer-readable storage medium stores program code, and the program code includes an instruction used to perform some or all steps of any one of the methods according to the first aspect to the sixth aspect.

An embodiment of this application further provides a computer program product. When the computer program product is run on a computer, the computer is enabled to perform some or all steps of any one of the methods according to the first aspect to the sixth aspect.

An embodiment of this application further provides a communications system. The communications system may include an access and mobility management network element configured to perform the method according to the first aspect, the fifth aspect, or the sixth aspect, or a session management network element configured to perform the method according to the second aspect or the third aspect, or a terminal configured to perform the method according to the fourth aspect.

In a possible design, the communications system includes the session management network element, the access and mobility management network element, and the terminal. The session management network element is configured to send a first message corresponding to a PDU session to the access and mobility management network element, where the first message includes first information to be sent to the terminal, and the PDU session is a PDU session that is established based on a non-3GPP access. The access and mobility management network element is configured to receive the first message, and send the first information to the terminal using a 3GPP access. The terminal is configured to receive the first information. Further, the access and mobility management network element may be further configured to reject activation of a user plane of the PDU session.

In a possible design, the communications system includes the session management network element, the access and mobility management network element, and the terminal. The session management network element is configured to send a first message corresponding to a PDU session to the access and mobility management network element, and reject activation of a user plane of the PDU session, where the first message includes first information to be sent to the terminal, and the PDU session is a PDU session that is established based on a non-3GPP access. The access and mobility management network element is configured to receive the first message. Further, the access and mobility management network element may be further configured to send the first information to the terminal. The terminal is configured to receive the first information.

For specific implementations and beneficial effects of any one of the apparatuses, the processing apparatus, the computer-readable storage medium, the computer program product, and the like provided above, refer to the foregoing corresponding methods. Details are not described herein again.

DESCRIPTION OF EMBODIMENTS

For ease of understanding of the technical solutions in the embodiments of this application, brief descriptions of related technologies in this application are first provided.

Figure 1:
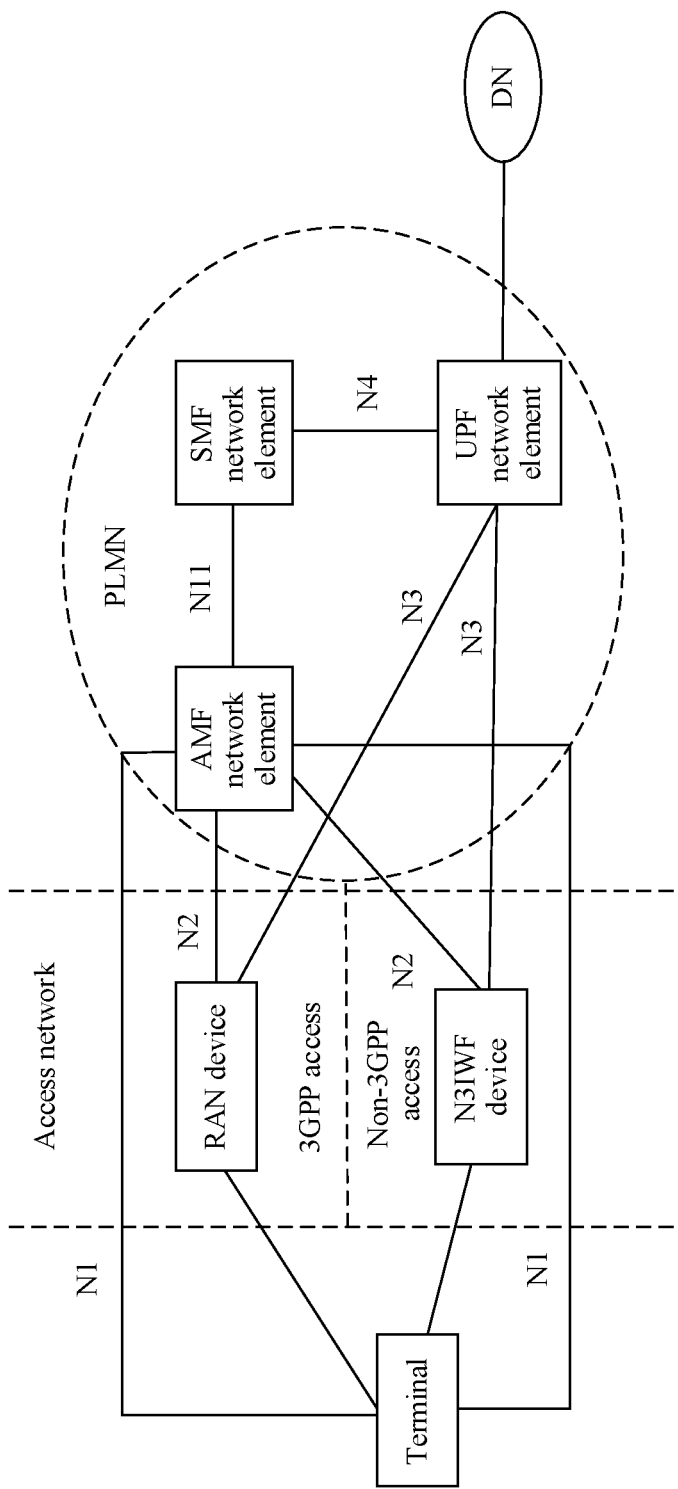
FIG. 1 is a schematic architectural diagram of a communications system applicable to an embodiment of this application.

FIG. 1 is a schematic architectural diagram of a communications system applicable to an embodiment of this application. The communications system shown in FIG. 1 is described using a 5G network architecture as an example. This architecture not only supports a terminal in accessing a PLMN using a 3GPP access, but also supports the terminal in accessing the PLMN using a non-3GPP access. The 3GPP access in this embodiment of this application may be a radio access in a 5G radio access network (RAN), another future 3GPP access, or the like. This is not limited in this embodiment of this application. The non-3GPP access in this embodiment of this application may be a WI-FI access, a Worldwide Interoperability for Microwave Access (WIMAX), a code-division multiple access (CDMA) access, another future non-3GPP access, or the like. This is not limited in this embodiment of this application.

As shown in FIG. 1, when accessing the PLMN using the 3GPP access, the terminal accesses the PLMN through a RAN device, when accessing the PLMN using the non-3GPP access, the terminal accesses the PLMN through a non-3GPP access point (untrusted non-3GPP access point) and a non-3GPP interworking function (N3IWF) device. The PLMN may include an access and mobility management function (AMF) network element, a session management function (SMF) network element, and a user plane function (UPF) network element. The RAN device or the N3IWF device may access a data network (DN) through the UPF network element. The AMF network element is responsible for access and mobility management, and the like. The SMF network element is responsible for session management and the like. The UPF network element is responsible for data packet routing and forwarding, and the like.

The terminal communicates with the AMF network element through a next-generation network (N) interface 1 (N1). The RAN device or the N3IWF device communicates with the AMF network element through an N2 interface (N2). The RAN device or the N3IWF device communicates with the UPF network element through an N3 interface (N3). The SMF network element communicates with the UPF network element through an N4 interface (N4). The AMF network element communicates with the SMF network element through an N11 interface (N11). It should be noted that names of the interfaces between the network elements in FIG. 1 are merely examples, and the interfaces may have other names during specific implementation. This is not limited in this embodiment of this application.

In a possible implementation, the RAN device in this embodiment of this application is a device that accesses the PLMN using the 3GPP access, for example, may be a base station, a broadband network gateway (BNG), or an aggregation switch. This is not limited in this embodiment of this application. The base station may include base stations in various forms, for example, a macro base station, a micro base station (also referred to as a small cell), a relay station, and an access point. This is not limited in this embodiment of this application.

In a possible implementation, the N3IWF device in this embodiment of this application is a device that accesses the PLMN using the non-3GPP access, and may be an access network device or may be a core network device, for example, may be a BNG, a broadband remote access server (BRAS), a fixed network access gateway, or a wireless local area network (WLAN) access gateway. This is not limited in this embodiment of this application.

It should be noted that, communications devices in FIG. 1, for example, the RAN device, the N3IWF device, the AMF network element, the SMF network element, and the UPF network element, are merely names, and the names constitute no limitation to the devices. In a 5G network and another future network, the RAN device, the N3IWF device, the AMF network element, the SMF network element, and the UPF network element may have other names, namely, network elements having same or similar functions. This is not limited in this embodiment of this application. In addition, in this embodiment of this application, the N3IWF device may be alternatively replaced with a next generation packet data gateway (NG-PDG), an N3IWF network element, an untrusted non-3GPP access gateway, a trusted non-3GPP access gateway, a fixed network access gateway function (AGF), or the like. The AMF network element may be replaced with an AMF, an AMF entity, or the like. The SMF network element may be replaced with an SMF, an SMF entity, or the like. Unified descriptions are provided herein, and details are not described again below.

Moreover, the PLMN may further include a unified data management (UDM) network element, an authentication server function (AUSF) network element, a policy control function (PCF) network element, and the like. This is not limited in this embodiment of this application.

In a possible implementation, in this embodiment of this application, the terminal may access different AMF network elements in a same PLMN using the 3GPP access and the non-3GPP access. Alternatively, according to an existing mechanism, the terminal may access a same AMF network element in a same PLMN using the 3GPP access and the non-3GPP access. Alternatively, the terminal may access different AMF network elements in different PLMNs using the 3GPP access and the non-3GPP access. This is not limited in this embodiment of this application.

Figure 2:
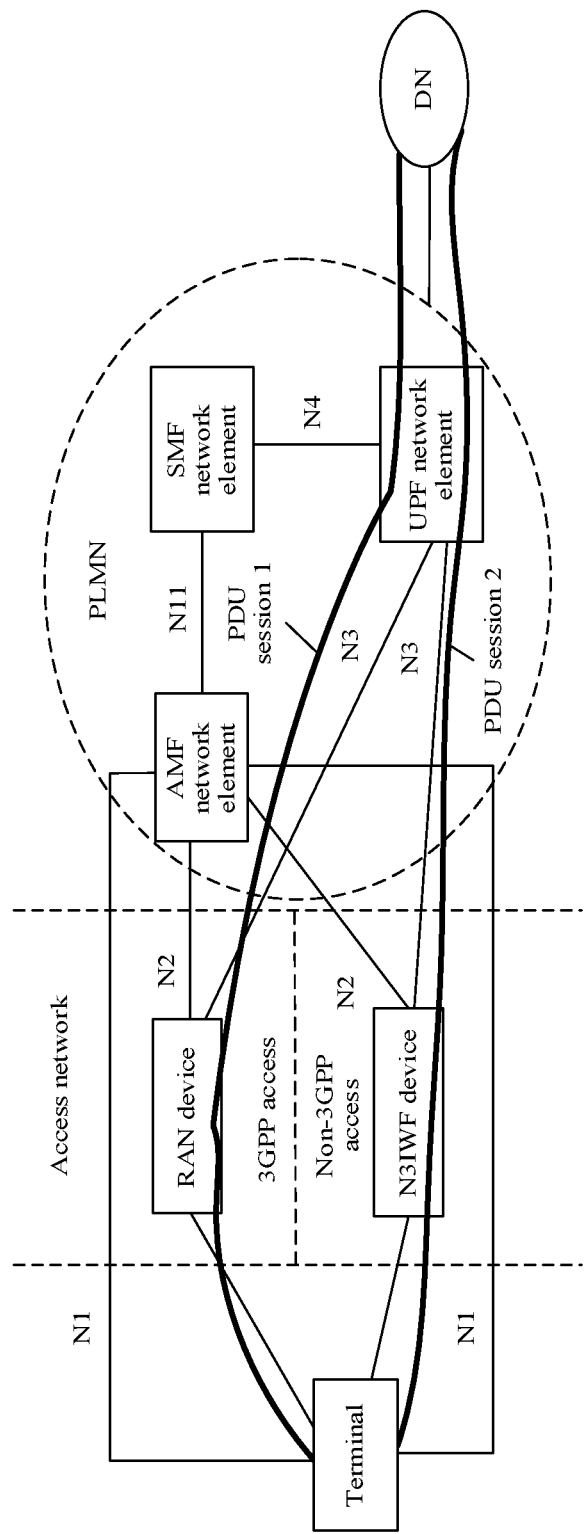
FIG. 2 is a schematic diagram of a PDU session applicable to an embodiment of this application.

The PLMN is allowed to be accessed by the terminal using both the 3GPP access and the non-3GPP access, and the terminal may establish PDU sessions respectively based on a 3GPP access network and a non-3GPP access network, as shown in FIG. 2. A PDU session 1 in FIG. 2 indicates a PDU session that is established by the terminal based on the 3GPP access network, and a PDU session 2 in FIG. 2 indicates a PDU session that is established by the terminal based on the non-3GPP access network.

The network architecture described in this embodiment of this application is intended to describe the technical solutions in the embodiments of this application more clearly, and does not constitute a limitation to the technical solutions provided in the embodiments of this application. A person of ordinary skill in the art may know that with the evolution of the network architecture, the technical solutions provided in the embodiments of this application are also applicable to similar technical problems. In addition, names of messages described in the embodiments of this application constitute no limitation to the messages. Unified descriptions are provided herein, and details are not described again below. For example, in a service-oriented architecture, a message may also be referred to as a service.

In a possible implementation, the terminal in this embodiment of this application may include various handheld devices having a wireless communication function, a vehicle-mounted device, a wearable device, or a computing device, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone, or a wireless local loop (WLL) station, a machine type communication (MTC) terminal, a user equipment (UE), a mobile station (MS), a terminal device, and the like. For ease of description, the devices mentioned above are collectively referred to as a terminal in this application.

The following describes the technical solutions provided in the embodiments of this application with reference to the accompanying drawings. Further, an example in which the embodiments of this application are applied to the system architecture shown in FIG. 1 is used for description below.

It should be noted that, an access and mobility management network element described in the embodiments of this application may be configured to perform connection management, mobility management, registration management, access authentication and authorization, reachability management, security context management, SMF network element selection, and the like, for example, may be the AMF network element in FIG. 1. A session management network element described in the embodiments of this application may be configured to perform session management and the like, for example, may be the SMF network element in FIG. 1. A terminal described in this application may be the terminal in FIG. 1.

In addition, it should be noted that some or all features in any quantity of embodiments described in the embodiments of this application may be combined in case of no conflict, to form a new embodiment.

Figure 3:
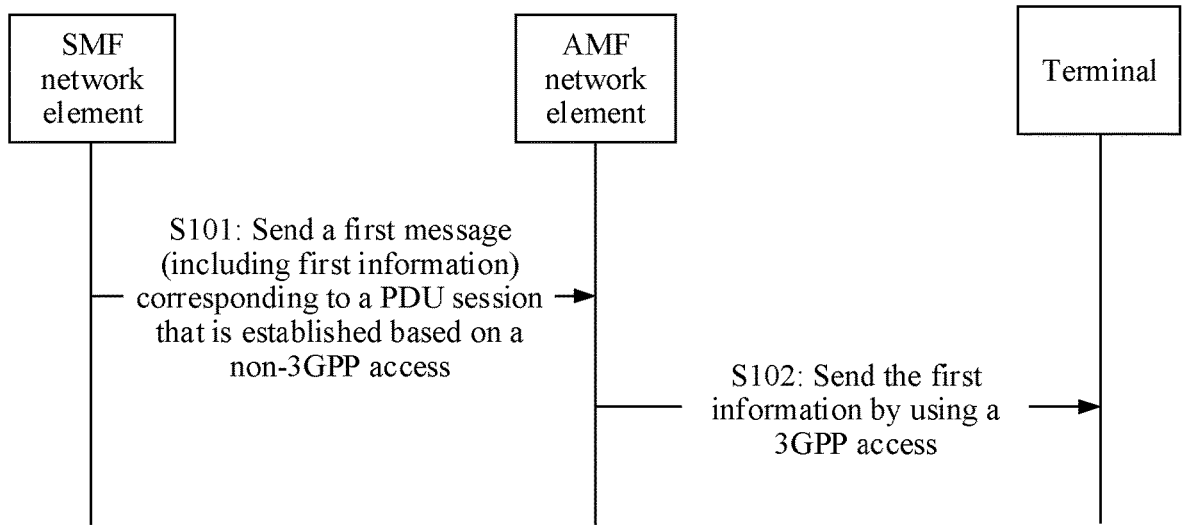
FIG. 3 is a first schematic interaction diagram of a communications method according to an embodiment of this application.

FIG. 3 is a schematic diagram of a communications method according to an embodiment of this application. The method shown in FIG. 3 includes the following steps.

S101: An SMF network element sends a first message corresponding to a PDU session to an AMF network element, where the first message includes first information to be sent to a terminal, and the PDU session is a PDU session that is established based on a non-3GPP access.

The PDU session may be any PDU session that is established by the terminal based on the non-3GPP access. The terminal is already registered with both the non-3GPP access and a 3GPP access.

It may be understood that, if information is classified based on different destinations to which the information is to be sent, types of the information may include information to be sent to the terminal, information to be sent to an access network device, and the like.

The first information is a type of information to be sent to the terminal, and content of the first information is not limited in this embodiment of this application. Usually, the AMF network element does not parse the content of the first information. For example, the first information may be N1 information. The N1 information may also be referred to as N1 type information, and is information to be sent by a network side (for example, the AMF network element or the SMF network element) to the terminal through an N1 interface. Further, the N1 information may be information generated by the SMF network element and sent to the terminal. In a possible implementation, the N1 information may include access type information, used to indicate an access type (for example, the non-3GPP access) corresponding to the N1 information.

In a possible implementation, the first message does not include second information to be sent to the access network device.

The second information is a type of information to be sent to the access network device, and content of the second information is not limited in this embodiment of this application. For example, the second information may be N2 information. The N2 information may also be referred to as N2 type information, and is information to be sent by the network side (for example, the AMF network element or the SMF network element) to the access network device through an N2 interface. Further, the N2 information may be information generated by the SMF network element and sent to the access network device. The access network device may perform a corresponding operation based on the N2 information, for example, update quality of service (QoS) information, or allocate a resource to a data flow based on QoS information, or determine whether a resource can be allocated to a data flow, or reject transmission of a data flow to which a resource cannot be allocated.

The first message corresponding to the PDU session is a message initiated (or triggered) by the SMF network element based on a PDU session processing procedure. For example, the PDU session processing procedure may include, but is not limited to a PDU session authorization/authentication procedure, a PDU session release procedure, or a PDU session modification procedure.

For example, the first message may be a service operation message based on the PDU session. The service operation message for the PDU session may be an N1N2 signaling transmission message, for example, an Namf_Communication_N1N2MessageTransfer message.

The N1N2 signaling transmission message is used to trigger the AMF network element to send the N1 information to the terminal, and/or used by the AMF network element to send the N2 information to the access network device. The N1N2 signaling transmission message may include the N1 information and/or the N2 information, and identifier information of the PDU session. The N1N2 signaling transmission message may also have another name. This is not limited in this embodiment of this application.

For the N1N2 signaling transmission message, refer to a definition in the 3GPP standard organization.

It may be understood that, the SMF network element may generate the N1N2 signaling transmission message in a user plane-triggered manner or a control plane-triggered manner.

In an example, if the N1N2 signaling transmission message is generated by the SMF network element in the user plane-triggered manner, the N1N2 signaling transmission message includes the N2 information but does not include the N1 information. An application scenario in which the SMF network element generates the N1N2 signaling transmission message in the user plane-triggered manner may be as follows: When receiving a data notification message sent by a UPF network element, the SMF network element generates the N1N2 signaling transmission message. Further, in this scenario, when receiving a downlink data packet of the PDU session, the UPF network element sends the data notification message to the SMF network element. Therefore, in this scenario, it may be considered that the N1N2 signaling transmission message is generated by the SMF network element in a data packet-triggered manner (that is, in the user plane-triggered manner).

In an example, if the N1N2 signaling transmission message is generated by the SMF network element in the control plane-triggered manner, the N1N2 signaling transmission message includes the N1 information. In a possible implementation, the N1N2 signaling transmission message further includes the N2 information. An application scenario in which the SMF network element generates the N1N2 signaling transmission message in the control plane-triggered manner may be as follows: When initiating the PDU session processing procedure, the SMF network element generates the N1N2 signaling transmission message as triggered. The initiating, by the SMF network element, the PDU session processing procedure includes initiating, by the SMF network element, the PDU session processing procedure when receiving a message (for example, a message related to session management (SM) policy modification and initiated by a PCF network element) sent by another function network element (for example, the PCF network element), or triggering, by the SMF network element, initiation of the PDU session processing procedure.

For example, if the PDU session processing procedure is the PDU session authorization/authentication procedure or the PDU session release procedure, and a user plane connection of the PDU session is not activated, the N1N2 signaling transmission message may include the N1 information but does not include the N2 information.

For another example, if the PDU session processing procedure is the PDU session modification procedure or the PDU session release procedure, and a user plane connection of the PDU session is in an active state, the N1N2 signaling transmission message may include the N1 information and the N2 information.

It can be learned from the foregoing descriptions that the first message includes the first information, indicating that the first message is triggered by a control plane. In a possible implementation, the first message further includes the identifier information of the PDU session. In another possible implementation, the first message further includes the access type (which is the non-3GPP access) information of the PDU session, and the like. In another possible implementation, the first message further includes a message type. For example, when the first message includes the first information, the message type may include an N1 type. When the first message includes the second information, the message type may include an N2 type. When the first message includes the first information and the second information, the message type may include an N1 type and an N2 type.

S102: After receiving the first message, the AMF network element sends the first information to the terminal using the 3GPP access.

In a possible implementation, after receiving the first message, if determining that the terminal is in an idle state in the non-3GPP access, the AMF network element sends the first information to the terminal using the 3GPP access. Certainly, this embodiment of this application also supports the following technical solution. After receiving the first message, if determining that the terminal is in a connected state in the non-3GPP access, the AMF network element sends the first information to the terminal using the 3GPP access.

In an example, the first information may be carried in a non-access stratum (NAS) message to be sent by the AMF network element to the terminal. Certainly, this embodiment of this application is not limited thereto.

This embodiment of this application provides a processing procedure used when the AMF network element receives the message sent by the SMF network element and including the first information to be sent to the terminal, and the message is a message corresponding to the PDU session that is established based on the non-3GPP access, and further, the first information is sent to the terminal using the 3GPP access. In this way, even if the terminal is in the idle state in the non-3GPP access, this embodiment of this application provides a solution for the AMF network element to send information related to the non-3GPP access to the terminal.

In a possible implementation, after S101 and before S102, the method further includes after receiving the first message, if determining that the terminal is in the idle state in the non-3GPP access, sending, by the AMF network element, a paging message or a notification message to the terminal using the 3GPP access such that the terminal initiates a service request process. The service request process is used to activate a user plane resource for the PDU session or establish a signaling connection for the PDU session such that the AMF network element sends information to the terminal, for example, performs S102.

In a possible implementation, the method further includes after receiving the first message, rejecting, by the AMF network element, activation of a user plane of the PDU session. This is proposed in consideration that "the first message corresponding to the PDU session includes the first information, and the first information is information to be sent to the terminal and is unrelated to an access network such that the user plane of the PDU session may be not activated". In this way, resource overheads caused by the activation of the user plane of the PDU session can be reduced.

Further, after determining that the first message includes the first information, and the first message is a message corresponding to the PDU session that is established based on the non-3GPP access, the AMF network element rejects the activation of the user plane of the PDU session. The AMF network element may determine whether information included in the first message is the first information or the second information or the first information and the second information and may determine whether the first message is a message corresponding to the PDU session that is established based on the non-3GPP access using known approaches. For example, the AMF network element may determine, based on the message type included in the first message, the information included in the first message. Further, if the message type included in the first message is the N1 type, the AMF network element determines that the first message includes the first information, if the message type included in the first message is the N2 type, the AMF network element determines that the first message includes the second information, if the message type included in the first message is the N1 type and the N2 type, the AMF network element determines that the first message includes the first information and the second information.

It should be noted that, during specific implementation, this embodiment of this application also supports the following technical solutions The AMF network element activates the user plane of the PDU session after receiving the first message. For example, if the first message carries instruction information used to instruct to activate the user plane of the PDU session, the AMF network element may activate the user plane of the PDU session based on the instruction information. The activation of the user plane of the PDU session refers to a procedure for initiating activation of the PDU session. A procedure for activating the PDU session may be implemented through signaling exchange between network element such as the AMF network element and the SMF network element.

The AMF network element may reject the activation of the user plane of the PDU session in one of the following manners.

Manner 1: The AMF network element sends a third message to the SMF network element, where the third message is used to notify the SMF network element that the user plane of the PDU session is not activated. Further, the third message is used to notify the SMF network element that the AMF network element does not activate (rejects) the user plane of the PDU session. For example, the third message may be a PDU session update context request (Nsmf_PDUSession_UpdateSMContext Request) message, and the message includes information indicating that a user plane resource is not to be established, for example, DEACTIVED.

Manner 2: The AMF network element rejects sending of a message to the SMF network element. That the AMF network element rejects sending of a message to the SMF network element may be understood as that the AMF network element skips sending a message to the SMF network element, where the message may be a PDU session update context request message.

Manner 3: The AMF network element sends a fourth message to the SMF network element, where the fourth message is used to notify the SMF network element that the user plane of the PDU session cannot be activated. Further, the fourth message is used to notify the SMF network element that the AMF network element cannot activate the user plane of the PDU session, or the SMF network element cannot activate the user plane of the PDU session.

In a possible implementation, the method may further include sending, by the AMF network element, access type (which is the non-3GPP access) information corresponding to the first information and/or access type (which is the non-3GPP access) information of the PDU session to the terminal using the 3GPP access. That is, this embodiment of this application supports the AMF network element in sending non-3GPP access type information to the terminal using the 3GPP access.

In this embodiment of this application, a message that is used to carry the access type information corresponding to the first information and/or the access type information of the PDU session and that is to be sent by the AMF network element to the terminal is not limited. For example, the access type information corresponding to the first information and/or the access type information of the PDU session may be carried in a service accept message to be sent by the AMF network element to the terminal. In addition, if the AMF network element sends the access type information corresponding to the first information and the access type information of the PDU session to the terminal, the access type information corresponding to the first information and the access type information of the PDU session may be carried in a same message, or may be carried in different messages. This is not limited in this embodiment of this application.

Figure 4A:
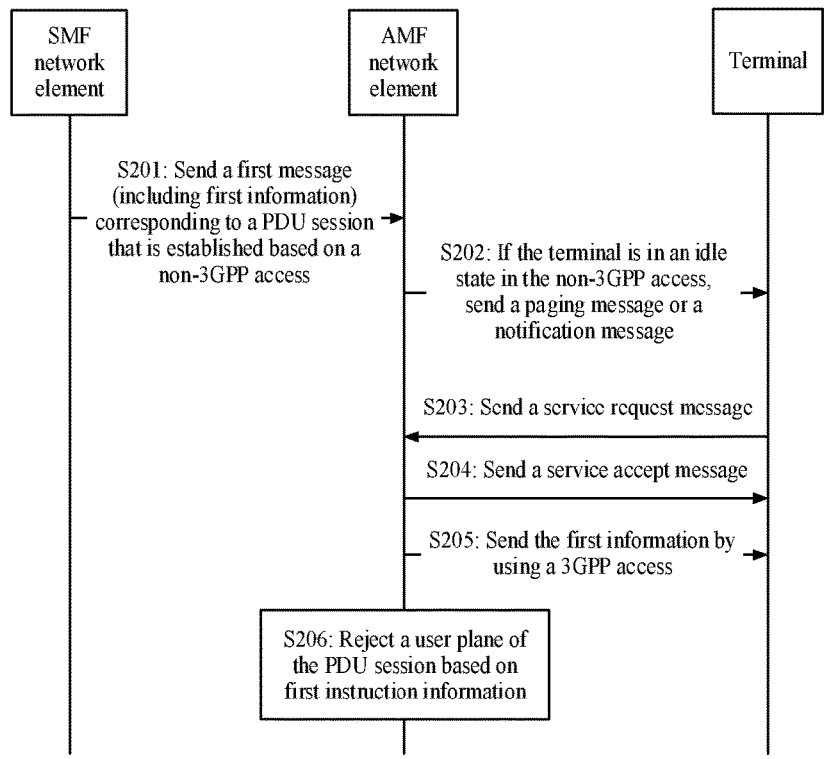
FIG. 4A is a second schematic interaction diagram of a communications method according to an embodiment of this application.
Figure 4B:
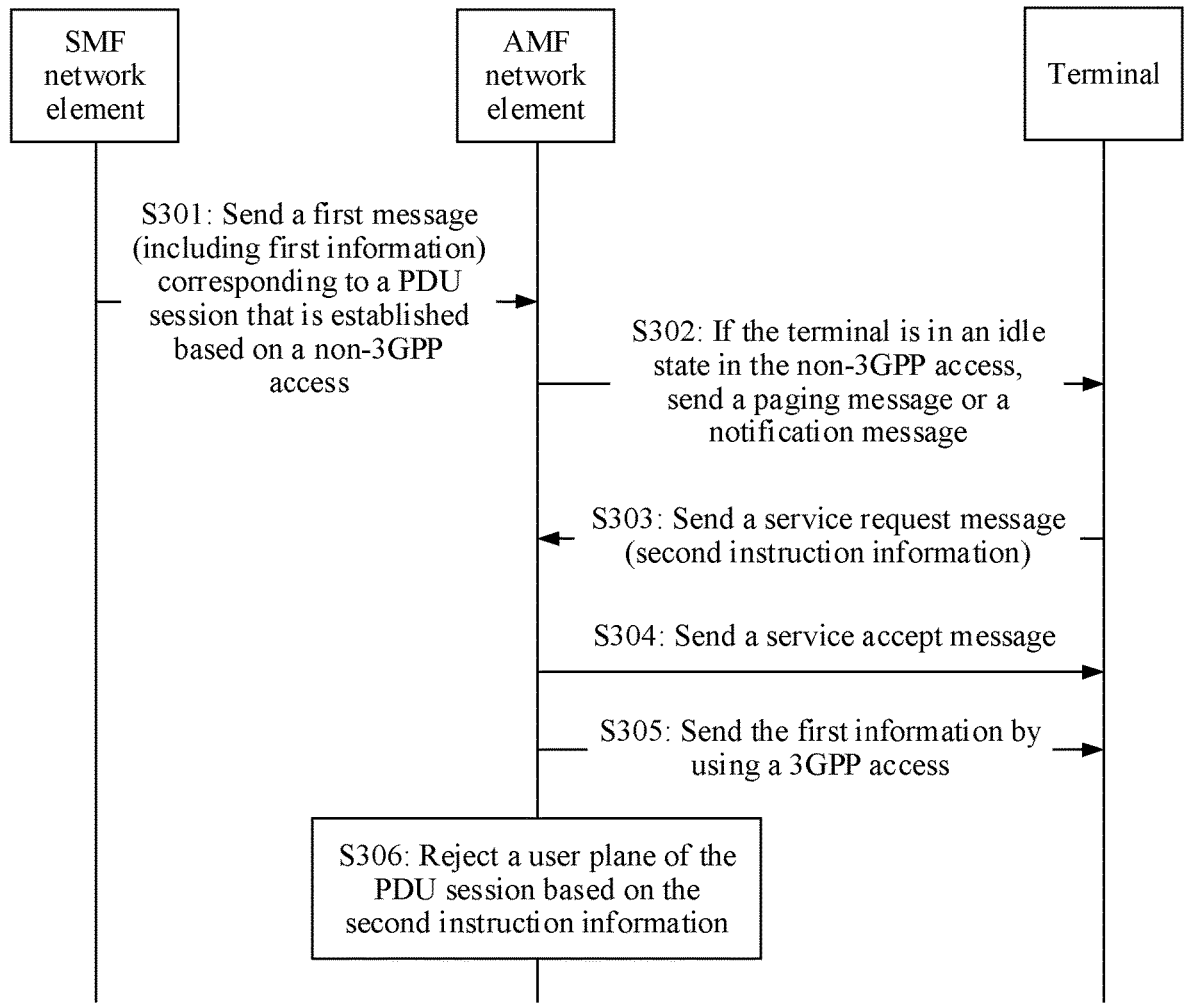
FIG. 4B is a third schematic interaction diagram of a communications method according to an embodiment of this application.

Embodiments shown in FIG. 4A and FIG. 4B are described below using the embodiment shown in FIG. 3 as an example. Therefore, for explanations of related content thereof, refer to explanations of the embodiment shown in FIG. 3 above. Details are not described below again.

FIG. 4A is a schematic diagram of a communications method according to an embodiment of this application. The method shown in FIG. 4A includes the following steps.

S201: An SMF network element sends a first message corresponding to a PDU session to an AMF network element, where the first message includes first information and first instruction information, the first instruction information is used to instruct not to activate a user plane of the PDU session, and the PDU session is a PDU session that is established based on a non-3GPP access.

S202: If a terminal is in an idle state in the non-3GPP access, the AMF network element sends a paging message or a notification message to the terminal using a 3GPP access.

Further, if the terminal is in the idle state in the 3GPP access, the AMF network element sends the paging message to the terminal using the 3GPP access. If the terminal is in a connected state in the 3GPP access, the AMF network element sends the notification message to the terminal using the 3GPP access. The paging message and the notification message are both used by the terminal to initiate a service request process, that is, are both used by the terminal to send a service request message to the AMF network element. The service request message is used to activate a user plane resource for the PDU session or establish a signaling connection for the PDU session.

S203: After receiving the paging message or the notification message, the terminal sends the service request message to the AMF network element.

S204: The AMF network element sends a service accept message to the terminal.

In a possible implementation, the service accept message includes access type (which is the non-3GPP access) information corresponding to the first information and/or access type (which is the non-3GPP access) information of the PDU session.

S205: The AMF network element sends the first information to the terminal using the 3GPP access. For example, the first information is carried in a NAS message.

In a possible implementation, the first information may be included in the service accept message in S204 to be sent by the AMF network element to the terminal.

S206: The AMF network element rejects activation of the user plane of the PDU session based on the first instruction information.

When S206 is performed, the terminal may be in the idle state or the connected state in the non-3GPP access. This is not limited in this embodiment of this application. S206 may be considered as a specific implementation of rejecting, by the AMF network element, the activation of the user plane of the PDU session.

A sequence of performing S202 to S205 and S206 is not limited in this embodiment of this application. For example, S202 to S205 may be performed before S206, or S206 may be performed before S202 to S205, or S206 may be performed in a process of performing S202 to S205.

FIG. 4B is a schematic diagram of a communications method according to an embodiment of this application. The method shown in FIG. 4B includes the following steps.

S301: An SMF network element sends a first message corresponding to a PDU session to an AMF network element, where the first message includes first information, and the PDU session is a PDU session that is established based on a non-3GPP access.

S302: If a terminal is in an idle state in the non-3GPP access, the AMF network element sends a paging message or a notification message to the terminal using a 3GPP access.

S303: After receiving the paging message or the notification message, the terminal sends a service request message to the AMF network element, where the service request message includes second instruction information, and the second instruction information is used to instruct not to activate a user plane of the PDU session.

That the terminal sends a service request message to the AMF network element is a specific implementation of sending, by the terminal, a second message to the AMF network element. The second message includes the second instruction information, and the second instruction information is used to instruct not to activate the user plane of the PDU session. That is, a specific implementation of the second message may be the service request message. Certainly, this embodiment of this application is not limited thereto. For example, the second message may alternatively be a message independent of the service request message.

The second instruction information may explicitly or implicitly instruct not to activate the user plane of the PDU session. For example, when an implicit manner is used, the second instruction information includes one of the following manners A to C.

Manner A: The second message does not include a set of PDU sessions allowed by the terminal.

Manner B: The second message includes a set of PDU sessions allowed by the terminal, and the set of PDU sessions allowed by the terminal is empty.

Manner C: The second message includes a set of PDU sessions allowed by the terminal, and the set of PDU sessions allowed by the terminal does not include identifier information of the PDU session.

During specific implementation, a specific one of the manners A to C that is included in the second instruction information may be predefined, for example, predetermined in a protocol. Certainly, this embodiment of this application is not limited thereto.

The set of PDU sessions allowed by the terminal is a set including PDU sessions that are established by the terminal using the non-3GPP access and that are allowed by the terminal to be migrated to the 3GPP access. The set of PDU sessions allowed by the terminal may include identifier information of one or more PDU sessions. In an example, the set of PDU sessions allowed by the terminal may be transmitted in a form of a list. In this case, the set of PDU sessions allowed by the terminal may also be referred to as a list of PDU sessions allowed by the terminal (the list of allowed PDU session(s)).

In an implementation, the paging message or the notification message includes third indication information, and the third indication information is used by the terminal to determine the second instruction information. In this case, after receiving the paging message or the notification message, the terminal may determine, based on the third indication information, that the second message includes the second instruction information. Alternatively, the third indication information may not be carried in the paging message or the notification message, but is carried in another message to be sent by the AMF network element to the terminal.

In another implementation, the terminal does not receive the third indication information, for example, the paging message or the notification message does not include the third indication information. In this case, after receiving the paging message or the notification message, the terminal determines that the second message includes the second instruction information. For example, when the paging message or the notification message is a message corresponding to the PDU session that is established based on the non-3GPP access, it is determined that the second message includes the second instruction information. In an example, the paging message or the notification message may include the identifier information of the PDU session.

In an example, the second message may be the service request message. Certainly, this embodiment of this application is not limited thereto. For example, the second message may alternatively be a message independent of the service request message. It may be understood that, if the second message is not the service request message, the method may further include sending, by the terminal, the service request message to the AMF network element, and after receiving the service request message, returning, by the AMF network element, a service accept message to the terminal.

S304: The AMF network element sends the service accept message to the terminal.

In a possible implementation, the service accept message includes information (which is the non-3GPP access) corresponding to the first information and/or access type (which is the non-3GPP access) information of the PDU session.

S305: The AMF network element sends the first information to the terminal using the 3GPP access.

S306: The AMF network element rejects the activation of the user plane of the PDU session based on the second instruction information.

When S306 is performed, the terminal may be in the idle state or a connected state in the non-3GPP access. This is not limited in this embodiment of this application. S306 may be considered as a specific implementation of rejecting, by the AMF network element, the activation of the user plane of the PDU session.

A sequence of performing S304 and S305 and S306 is not limited in this embodiment of this application. For example, S304 and S305 may be performed before S306, or S306 may be performed before S304 and S305, or S306 may be performed in a process of performing S304 and S305.

Figure 5:
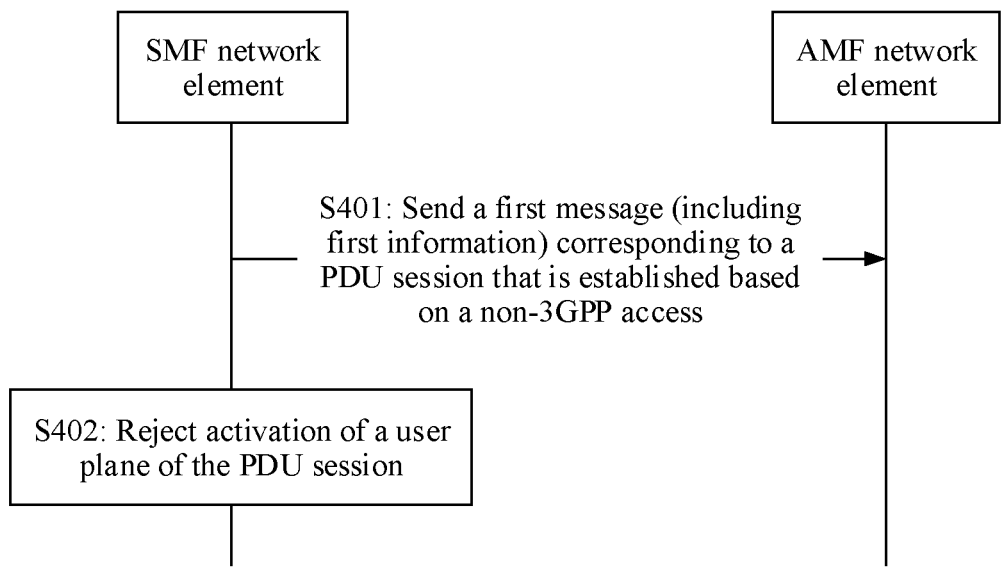
FIG. 5 is a fourth schematic interaction diagram of a communications method according to an embodiment of this application.

FIG. 5 is a schematic diagram of a communications method according to an embodiment of this application. The method shown in FIG. 5 includes the following steps.

S401: An SMF network element sends a first message corresponding to a PDU session to an AMF network element, where the first message includes first information, and the PDU session is a PDU session that is established based on a non-3GPP access.

For descriptions of related terms and implementations in S401, refer to foregoing descriptions of related terms and implementations in S101.

S402: The SMF network element rejects activation of a user plane of the PDU session.

In a possible implementation, when the first message corresponding to the PDU session includes the first information, and the PDU session is a PDU session that is established based on the non-3GPP access, the SMF network element rejects the activation of the user plane of the PDU session. A sequence of performing S401 and S402 is not limited in this embodiment of this application. For example, S401 may be performed before S402, or S402 may be performed before S401, or S401 and S402 may be performed simultaneously.

In a possible implementation, the rejecting, by the SMF network element, activation of a user plane of the PDU session may include sending, by the SMF network element, a fifth message to the AMF network element, where the fifth message is used to notify the AMF network element that the user plane of the PDU session is not activated.

In a possible implementation, the method further includes sending, by the SMF network element to the AMF network element, information about a reason why the user plane of the PDU session is not activated. For example, the information about the reason may include N1 information. That is, the reason why the user plane of the PDU session is not activated is that the first message carries information to be sent to the terminal. It should be noted that, if the information included in the first message is information to be sent to an access network device, the SMF network element may activate the user plane of the PDU session, to be specific, initiate a procedure for activating the user plane of the PDU session. Certainly, the activation of the user plane of the PDU session may alternatively be rejected.

This embodiment of this application provides a processing procedure used when the first message corresponding to the PDU session from the SMF network element to the AMF network element includes the first information, and the PDU session is a PDU session that is established based on the non-3GPP access, and the activation of the user plane of the PDU session is rejected. This is proposed in consideration that "the first message corresponding to the PDU session includes the first information, indicating that the first information is triggered by a control plane such that data does not need to be transmitted using the PDU session, and the user plane of the PDU session may be not activated". In this way, resource overheads caused by the activation of the user plane of the PDU session can be reduced.

Figure 6A:
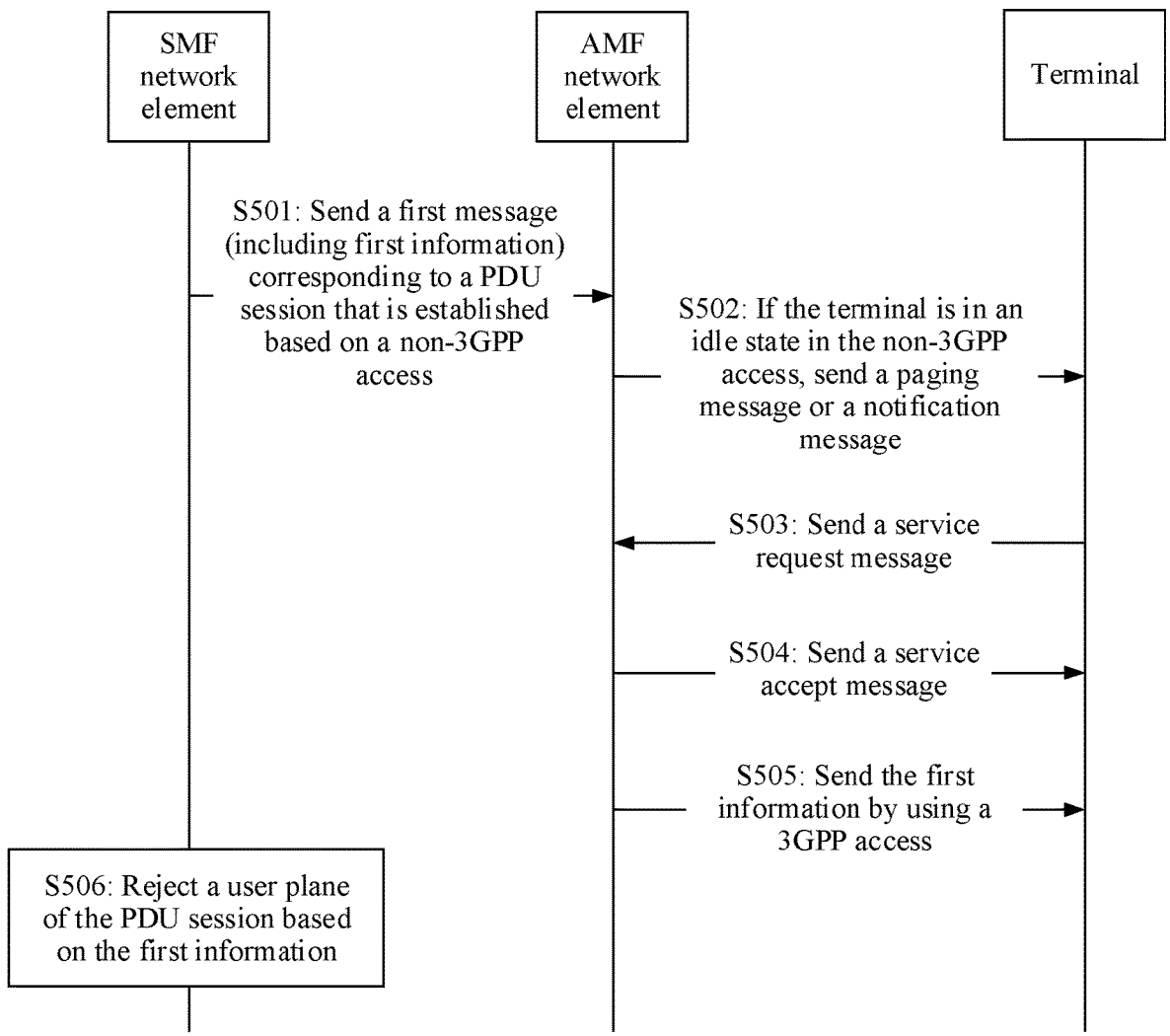
FIG. 6A is a fifth schematic interaction diagram of a communications method according to an embodiment of this application.
Figure 6B:
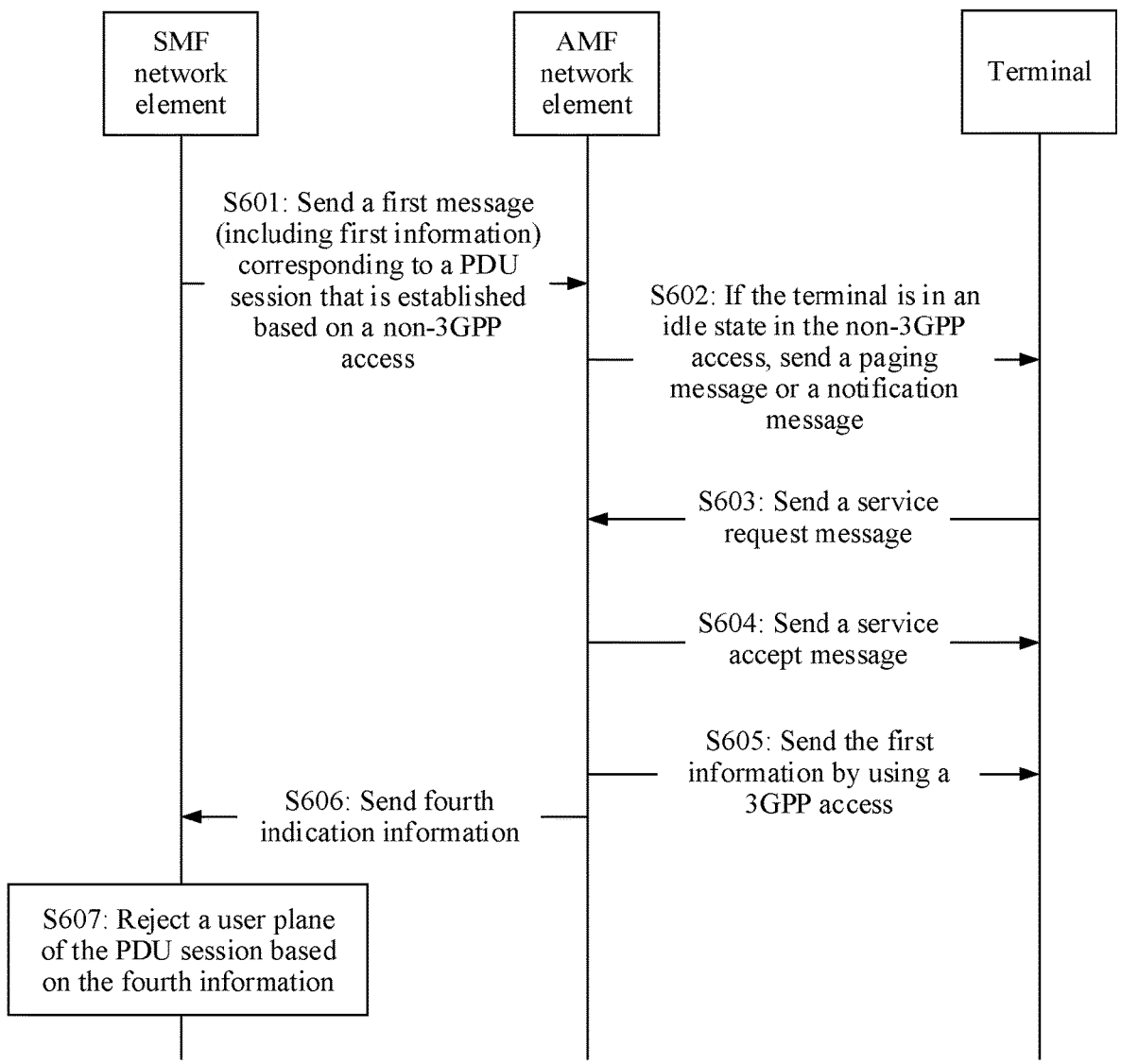
FIG. 6B is a sixth schematic interaction diagram of a communications method according to an embodiment of this application.

Embodiments shown in FIG. 6A and FIG. 6B are described as an example based on the embodiment shown in FIG. 5. Therefore, for explanations of related content thereof, refer to explanations of the embodiment shown in FIG. 5 above. Details are not described below again.

FIG. 6A is a schematic diagram of a communications method according to an embodiment of this application. The method shown in FIG. 6A includes the following steps.

S501: An SMF network element sends a first message corresponding to a PDU session to an AMF network element, where the first message includes first information, and the PDU session is a PDU session that is established based on a non-3GPP access.

S502: If a terminal is in an idle state in the non-3GPP access, the AMF network element sends a paging message or a notification message to the terminal using a 3GPP access.

S503: After receiving the paging message or the notification message, the terminal sends a service request message to the AMF network element.

S504: The AMF network element sends a service accept message to the terminal.

S505: The AMF network element sends the first information to the terminal. In a possible implementation, the AMF network element may further send access type information corresponding to the first information and/or access type information of the PDU session to the terminal.

S506: The SMF network element rejects activation of a user plane of the PDU session based on the first information. S506 may be considered as a specific implementation of S402.

A sequence of performing S503 to S505 and S506 is not limited in this embodiment of this application. For example, S503 to S505 may be performed before S506, or S506 may be performed before S503 to S505, or S506 may be performed in a process of performing S503 to S505.

In a possible implementation, the method further includes sending, by the SMF network element to the AMF network element, information about a reason why the user plane of the PDU session is not activated.

FIG. 6B is a schematic diagram of a communications method according to an embodiment of this application. The method shown in FIG. 6B includes the following steps.

S601 to S605: Refer to S501 to S505 above. Certainly, this embodiment of this application is not limited thereto.

S606: The AMF network element sends fourth indication information to the SMF network element, where the fourth indication information is used to indicate at least one of the terminal is in an idle state in the non-3GPP access, the terminal is unreachable in the non-3GPP access, access type information corresponding to the first information, or a signaling connection is to be established and no user plane connection is to be established.

That the terminal is in an idle state in the non-3GPP access means that the terminal is in the idle state in the non-3GPP access when sending the paging message or the notification message in S602.

That the terminal is unreachable in the non-3GPP access may be understood as that the AMF network element cannot establish a connection to the terminal in the non-3GPP access.

Access type information corresponding to N1 information is used to indicate an access type (which is the non-3GPP access) corresponding to the N1 information.

That a signaling connection is to be established and no user plane connection is to be established may be include sending the first information to the terminal, and so on.

S607: The SMF network element rejects activation of the user plane of the PDU session based on the fourth indication information. S606 may be considered as a specific implementation of S402.

A sequence of performing S603 to S605 and S606 and S607 is not limited in this embodiment of this application. For example, S603 to S605 may be performed before S606 and S607, or S606 and S607 may be performed before S603 to S605, or some or all of S606 and S607 may be performed in a process of performing S603 to S605, or some or all of S603 to S605 may be performed in a process of performing S606 and S607.

In a possible implementation, the method further includes sending, by the SMF network element to the AMF network element, information about a reason why the user plane of the PDU session is not activated.

It should be noted that, any one of the foregoing embodiments is also applicable to a scenario in which the first message further includes second information to be sent to an access network device.

Figure 7:
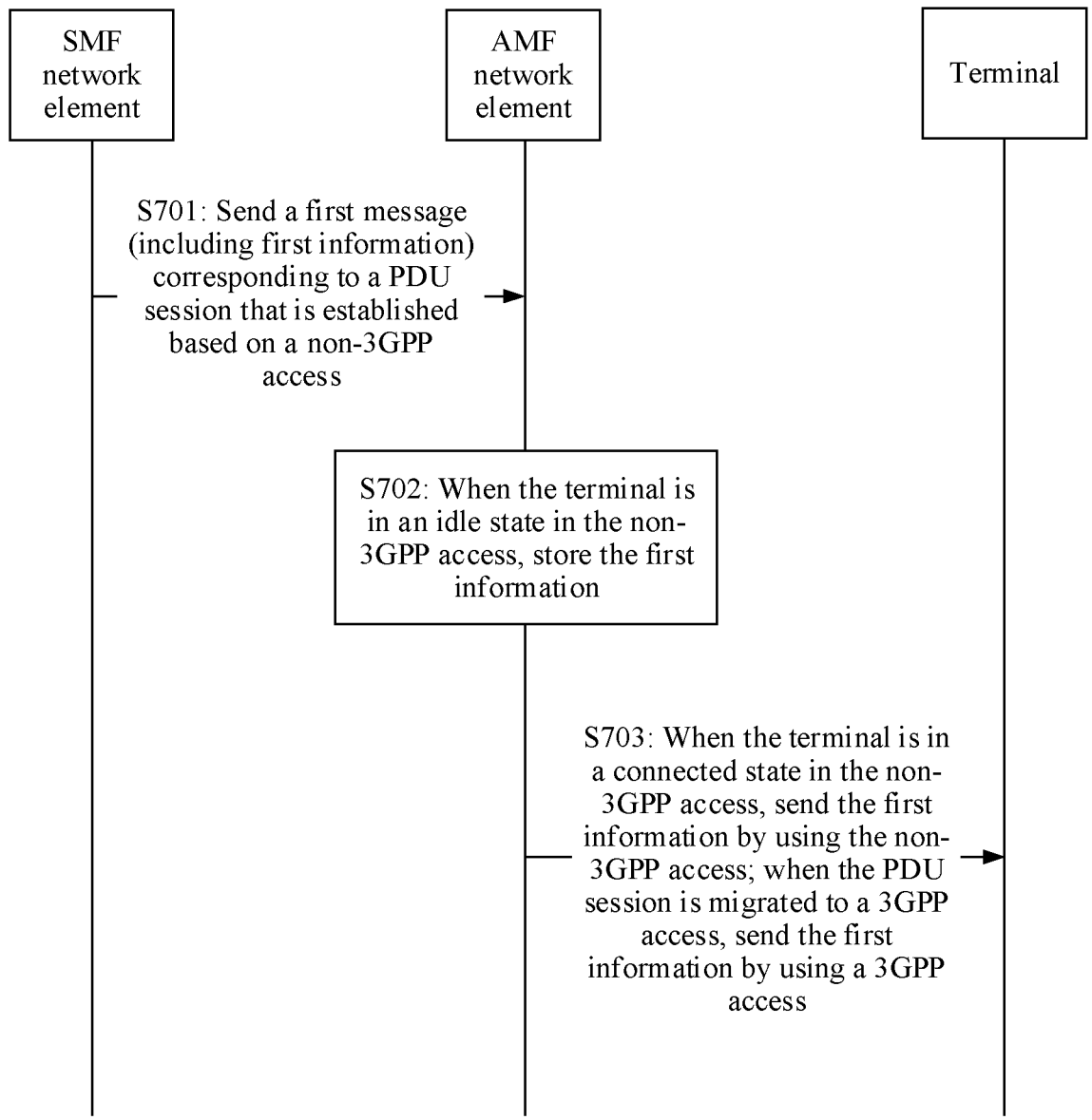
FIG. 7 is a seventh schematic interaction diagram of a communications method according to an embodiment of this application.

FIG. 7 is a schematic diagram of a communications method according to an embodiment of this application. For explanations of related content in this embodiment, refer to the foregoing descriptions. The method shown in FIG. 7 includes the following steps.

S701: An SMF network element sends a first message corresponding to a PDU session to an AMF network element, where the first message includes first information to be sent to a terminal, and the PDU session is a PDU session that is established based on a non-3GPP access.

For descriptions of related terms and implementations in S701, refer to foregoing descriptions of related terms and implementations in S101.

S702: When the terminal is in an idle state in the non-3GPP access, the AMF network element stores the first information.

S703: When the terminal is in a connected state in the non-3GPP access, the AMF network element sends the first information to the terminal using the non-3GPP access, when the PDU session is migrated to a 3GPP access, the AMF network element sends the first information to the terminal using the 3GPP access.

It should be noted that, if the PDU session is migrated to the 3GPP access, the AMF network element may send a session update context message to the SMF network element, to instruct the SMF network element to update an access type of the PDU session from the non-3GPP access to the 3GPP access.

In a possible implementation, the first message further includes second information to be sent to an access network device. In this case, S702 may be replaced with the following: the AMF network element stores the first information and the second information. The method may further include when the terminal is in the connected state in the non-3GPP access, sending, by the AMF network element, the second information to the access network device using the non-3GPP access, or when the PDU session is migrated to the 3GPP access, sending, by the AMF network element, the second information to the access network device using the 3GPP access.

In this embodiment, when the terminal is in the idle state in the non-3GPP access, the AMF network element may not send a paging message or a notification message to the terminal, but store the first information. In this way, signaling overheads caused by sending of the paging message or the notification message can be reduced.

The solutions provided in the embodiments of this application are described above mainly from a perspective of interaction between the different network elements. It may be understood that, to implement the foregoing functions, the access and mobility management network element, the session management network element, the terminal, and the like include corresponding hardware structures and/or software modules for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, division into functional units may be performed on the access and mobility management network element, the session management network element, the terminal, and the like based on the foregoing method examples. For example, the functional units may be obtained through division based on corresponding functions, or at least two functions may be integrated into one processing unit. The integrated unit may be implemented in a form of hardware, or may be implemented in a form of a software functional unit. It should be noted that, in this embodiment of this application, unit division is an example, and is merely a logical function division. During actual implementation, another division manner may be used.

Figure 8:
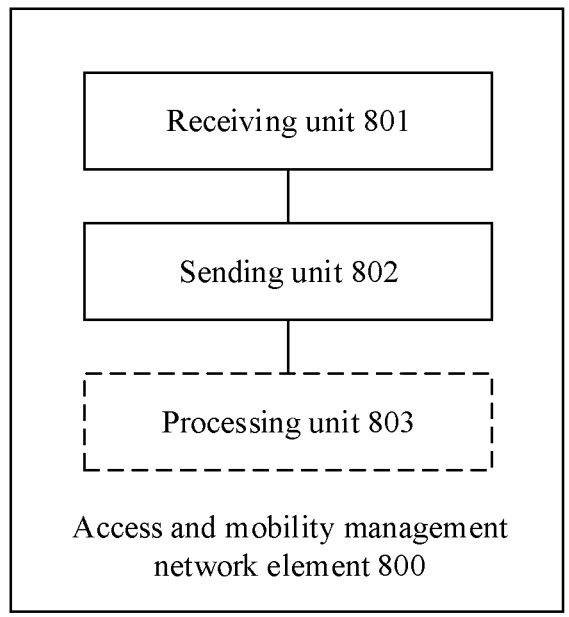
FIG. 8 is a first schematic structural diagram of an access and mobility management network element according to an embodiment of this application.

FIG. 8 is a schematic structural diagram of an access and mobility management network element 800 according to an embodiment of this application. The mobility management network element 800 may be configured to perform the steps performed by the AMF network element in FIG. 3, FIG. 4A, FIG. 4B, FIG. 6A, and FIG. 6B. The access and mobility management network element 800 includes a receiving unit 801 and a sending unit 802. The receiving unit 801 is configured to receive a first message corresponding to a PDU session from a session management network element, where the first message includes first information to be sent to a terminal, and the PDU session is a PDU session that is established based on a non-3GPP access. The sending unit 802 is configured to send the first information to the terminal using a 3GPP access. For example, with reference to FIG. 3, the receiving unit 801 may be configured to perform a receiving step corresponding to S101. The sending unit 802 may be configured to perform S102.

In a possible implementation, the access and mobility management network element 800 further includes a processing unit 803. The processing unit 803 is configured to reject activation of a user plane of the PDU session. For example, with reference to FIG. 4A, the processing unit 803 may be configured to perform S206. For example, with reference to FIG. 4B, the processing unit 803 may be configured to perform S306.

In a possible implementation, the first message further includes first instruction information, and the first instruction information is used to instruct not to activate the user plane of the PDU session, and the processing unit 803 is configured to reject the activation of the user plane of the PDU session based on the first instruction information. For example, with reference to FIG. 4A, the processing unit 803 may be configured to perform S206.

In a possible implementation, the sending unit 802 is further configured to if the terminal is in an idle state in the non-3GPP access, send a paging message or a notification message to the terminal using the 3GPP access, the receiving unit 801 is further configured to receive a second message from the terminal, where the second message includes second instruction information, and the second instruction information is used to instruct not to activate the user plane of the PDU session, and t the processing unit 803 is further configured to reject the activation of the user plane of the PDU session based on the second instruction information. For example, with reference to FIG. 4B, the sending unit 802 may be configured to perform S302, the receiving unit 801 may be configured to perform a receiving step corresponding to S303, and the processing unit 803 is configured to perform S306.

In a possible implementation, the second instruction information includes the second message does not include a set of PDU sessions allowed by the terminal, or the second message includes a set of PDU sessions allowed by the terminal, and the set of PDU sessions allowed by the terminal is empty. The set of PDU sessions allowed by the terminal is a set of PDU sessions that are established by the terminal using the non-3GPP access and that are allowed by the terminal to be migrated to the 3GPP access.

In a possible implementation, the paging message or the notification message includes third indication information, and the third indication information is used by the terminal to determine the second instruction information.

In a possible implementation, the processing unit 803 is further configured to send a third message to the session management network element, where the third message is used to notify the session management network element that the user plane of the PDU session is not activated, or reject sending a message to the session management network element, or send a fourth message to the session management network element, where the fourth message is used to notify the session management network element that the user plane of the PDU session cannot be activated.

In a possible implementation, the receiving unit 801 is further configured to receive a fifth message from the session management network element, where the fifth message is used to notify the access and mobility management network element that the user plane of the PDU session is not activated.

In a possible implementation, the sending unit 802 is further configured to send fourth indication information to the session management network element, where the fourth indication information is used to indicate at least one of the terminal is in the idle state in the non-3GPP access, the terminal is unreachable in the non-3GPP access, access type information corresponding to the first information, or a signaling connection is to be established and no user plane connection is to be established, and the fourth indication information is used by the session management network element to determine the fifth message. For example, with reference to FIG. 6B, the sending unit 802 may be configured to perform S603.

In a possible implementation, the sending unit 802 is further configured to receive, from the session management network element, information about a reason why the user plane of the PDU session is not activated. For example, the information about the reason includes the first information.

In a possible implementation, the sending unit 802 is further configured to send access type information corresponding to the first information to the terminal using the 3GPP access.

In a possible implementation, the first message does not include second information to be sent to an access network device.

In a possible implementation, the access and mobility management network element further includes the processing unit 803 configured to determine that the terminal is already registered with both the 3GPP access and the non-3GPP access.

In a possible implementation, the first message is a service operation message based on the PDU session.

Figure 9:
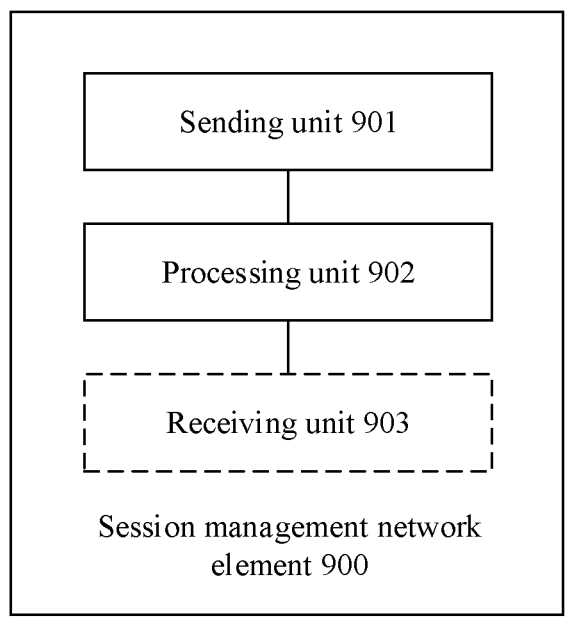
FIG. 9 is a first schematic structural diagram of a session management network element according to an embodiment of this application.

FIG. 9 is a schematic structural diagram of a session management network element 900 according to an embodiment of this application. The session management network element 900 may be configured to perform the steps performed by the SMF network element in FIG. 5, FIG. 6A, and FIG. 6B. The session management network element 900 includes a sending unit 901 and a processing unit 902. The sending unit 901 is configured to send a first message corresponding to a PDU session to an access and mobility management network element, where the first message includes first information to be sent to a terminal, and the PDU session is a PDU session that is established based on a non-3GPP access. The processing unit 902 is configured to reject activation of a user plane of the PDU session. For example, with reference to FIG. 5, the sending unit 901 may be configured to perform S404, and the processing unit 902 may be configured to perform S402. For example, with reference to FIG. 6A, the sending unit 901 may be configured to perform S501, and the processing unit 902 may be configured to perform S506. For example, with reference to FIG. 6B, the sending unit 901 may be configured to perform S601, and the processing unit 902 may be configured to perform S607.

In a possible implementation, the processing unit 902 is configured to reject the activation of the user plane of the PDU session based on the first information. For example, with reference to FIG. 6A, the processing unit 902 may be configured to perform S506.

In a possible implementation, the session management network element 900 further includes a receiving unit 903 configured to receive fourth indication information from the access and mobility management network element, where the fourth indication information is used to indicate at least one of the terminal is in an idle state in the non-3GPP access, the terminal is unreachable in the non-3GPP access, access type information corresponding to the first information, or a signaling connection is to be established and no user plane connection is to be established, and the processing unit 902 is further configured to reject the activation of the user plane of the PDU session based on the fourth indication information. For example, with reference to FIG. 6B, the receiving unit 903 may be configured to perform a receiving step corresponding to S606.

In a possible implementation, the processing unit 902 is further configured to send a fifth message to the access and mobility management network element, where the fifth message is used to notify the access and mobility management network element that the user plane of the PDU session is not activated.

In a possible implementation, the sending unit 901 is further configured to send, to the access and mobility management network element, information about a reason why the activation of the user plane of the PDU session is rejected. For example, the information about the reason includes the first information.

In a possible implementation, the first message does not include second information to be sent to an access network device.

In a possible implementation, the first message is a service operation message based on the PDU session.

Figure 10:
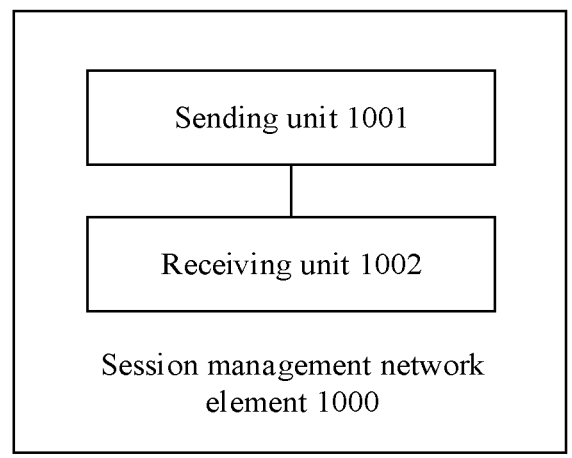
FIG. 10 is a second schematic structural diagram of a session management network element according to an embodiment of this application.

FIG. 10 is a schematic structural diagram of a session management network element 1000 according to an embodiment of this application. The session management network element 1000 may be configured to perform the steps performed by the SMF network element in FIG. 3, FIG. 4A, and FIG. 4B. The session management network element 1000 includes a sending unit 1001 and a receiving unit 1002. The sending unit 1001 is configured to send a first message corresponding to a PDU session to an access and mobility management network element, where the first message includes first information to be sent to a terminal, and the PDU session is a PDU session that is established based on a non-3GPP access. The receiving unit 1002 is configured to receive a third message or a fourth message from the access and mobility management network element, where the third message is used to notify the session management network element that a user plane of the PDU session is not activated, and the fourth message is used to notify the session management network element that the user plane of the PDU session cannot be activated. For example, with reference to FIG. 3, FIG. 4A, or FIG. 4B, the sending unit 1001 may be configured to perform S101, S201, or S301. The receiving unit 1002 may be configured to perform a receiving step corresponding to sending, by the access and mobility management network element, the third message or the fourth message above.

In a possible implementation, the first message does not include second information to be sent to an access network device.

In a possible implementation, the first message is a service operation message based on the PDU session.

Figure 11:
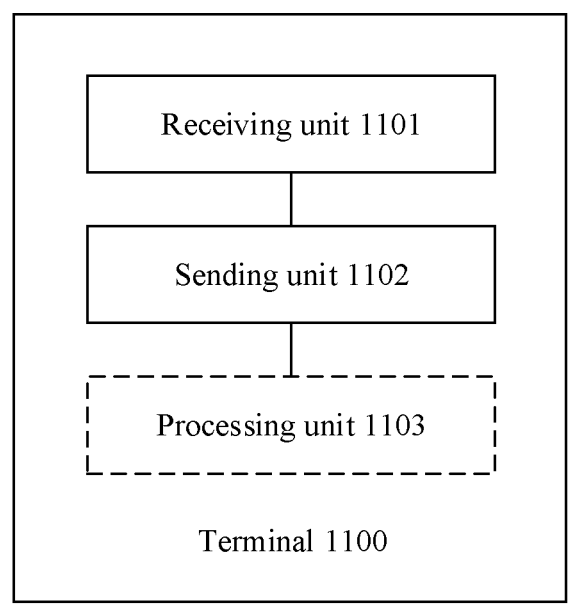
FIG. 11 is a schematic structural diagram of a terminal according to an embodiment of this application.

FIG. 11 is a schematic structural diagram of a terminal 1100 according to an embodiment of this application. The terminal 1100 may be configured to perform the steps performed by the terminal in FIG. 4B. The terminal 1100 includes a receiving unit 1101 and a sending unit 1102. The receiving unit 1101 is configured to when the terminal is in an idle state in a non-3GPP access, receive a paging message or a notification message from an access and mobility management network element using a 3GPP access. The sending unit 1102 is configured to send a second message to the access and mobility management network element using the 3GPP access, where the second message includes second instruction information, and the second instruction information is used to instruct not to activate a user plane of a PDU session, and the PDU session is a PDU session that is established based on the non-3GPP access. For example, with reference to FIG. 4B, the receiving unit 1101 may be configured to perform a receiving step corresponding to S302, and the sending unit 1102 may be configured to perform S303.

In a possible implementation, the second instruction information includes the second message does not include a set of PDU sessions allowed by the terminal, or the second message includes a set of PDU sessions allowed by the terminal, and the set of PDU sessions allowed by the terminal is empty. The set of PDU sessions allowed by the terminal is a set of PDU sessions that are established by the terminal using the non-3GPP access and that are allowed by the terminal to be migrated to the 3GPP access.

In a possible implementation, the paging message or the notification message includes third indication information, and the terminal 1100 further includes a processing unit 1103 configured to determine the second instruction information based on the third indication information.

In a possible implementation, the receiving unit 1101 is further configured to receive access type information corresponding to the first information from the access and mobility management network element using the 3GPP access.

In a possible implementation, the terminal is already registered with both the 3GPP access and the non-3GPP access.

Figure 12:
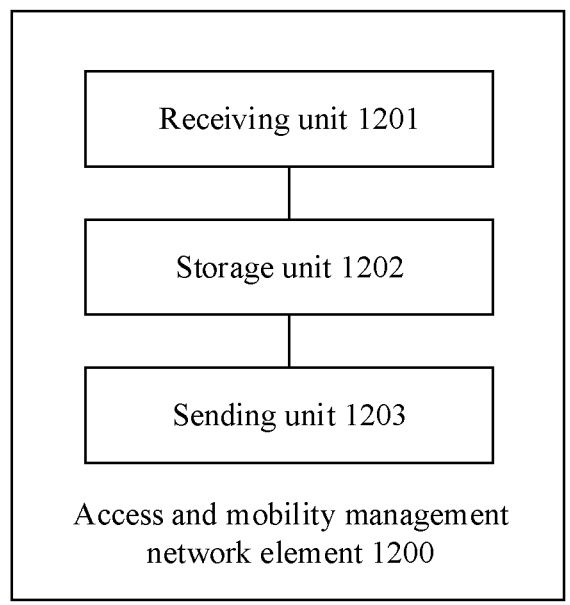
FIG. 12 is a second schematic structural diagram of an access and mobility management network element according to an embodiment of this application.

FIG. 12 is a schematic structural diagram of an access and mobility management network element 1200 according to an embodiment of this application. The access and mobility management network element 1200 may be configured to perform the steps performed by the AMF network element in FIG. 7. The access and mobility management network element 1200 includes a receiving unit 1201, a storage unit 1202, and a sending unit 1203. The receiving unit 1201 is configured to receive a first message corresponding to a PDU session from a session management network element, where the first message includes first information to be sent to a terminal, and the PDU session is a PDU session that is established based on a non-3GPP access. The storage unit 1202 is configured to when the terminal is in an idle state in the non-3GPP access, store the first information. The sending unit 1203 is configured to when the terminal is in a connected state in the non-3GPP access, send the first information to the terminal using the non-3GPP access, or when the PDU session is migrated to a 3GPP access, send the first information to the terminal using the 3GPP access. For example, with reference to FIG. 7, the receiving unit 1201 may be configured to perform a receiving step in S701, the storage unit 1202 may be configured to perform S702, and the sending unit 1203 may be configured to perform S703.

In a possible implementation, the first message further includes second information to be sent to an access network device.

For explanations, specific implementations, beneficial effects, and the like of related content of any one of the apparatuses (including the access and mobility management network element 800, the session management network element 900, the session management network element 1000, the terminal 1100, and the access and mobility management network element 1200) described above, refer to the method embodiments provided above. Details are not described herein again.

For explanations, specific implementations, beneficial effects, and the like of related content of any one of the apparatuses (including the access and mobility management network element 800, the session management network element 900, the session management network element 1000, the terminal 1100, and the access and mobility management network element 1200) described above, refer to the method embodiments provided above. Details are not described herein again.

Any one of the foregoing processing units (for example, the processing unit 803, the processing unit 902, or the processing unit 1103) may be a processor or a controller. The processor or controller may implement or execute various example logical blocks, units, and circuits described with reference to content disclosed in this application. The receiving unit and the sending unit may be a transceiver. During specific implementation, the transceiver may include one or more interfaces. The storage unit may be a memory. When the processing unit is a processor, the receiving unit and the sending unit are a transceiver, and the storage unit is a memory, the apparatus (for example, the access and mobility management network element 800, the session management network element 900, the session management network element 1000, the terminal 1100, or the access and mobility management network element 1200) in this embodiment of this application may be an apparatus 1300 shown in FIG. 13.

Figure 13:
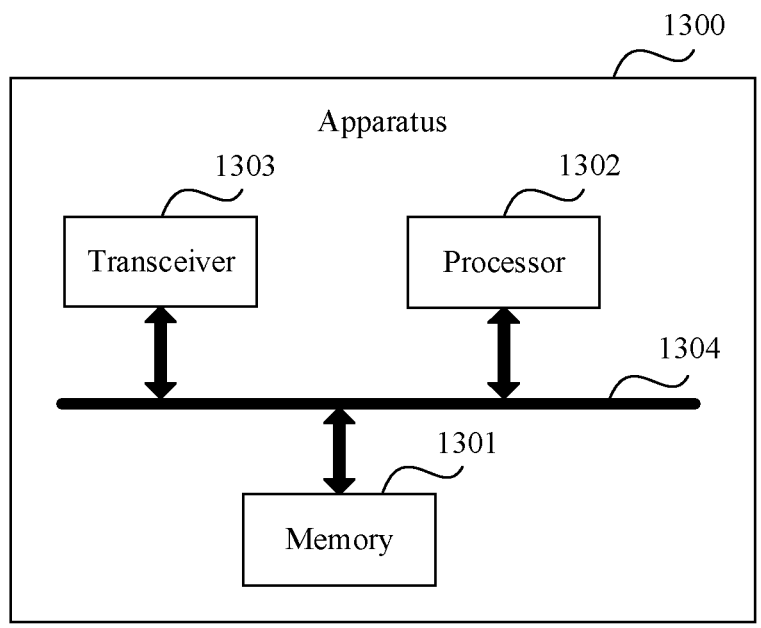
FIG. 13 is a schematic structural diagram of an apparatus according to an embodiment of this application.

As shown in FIG. 13, the apparatus 1300 includes a processor 1302 and a transceiver 1303. Further, the apparatus 1300 may further include a memory 1301. In a possible implementation, the apparatus 1300 may further include a bus 1304. The transceiver 1303, the processor 1302, and the memory 1301 may be connected to each other using the bus 1304. The bus 1304 may be a peripheral component interconnect (PCI) bus, an Extended Industry Standard Architecture (EISA) bus, or the like. The bus 1304 may be classified into an address bus, a data bus, a control bus, and the like. For ease of representation, only one thick line is used to represent the bus in FIG. 13, but this does not mean that there is only one bus or only one type of bus. For example, the apparatus 1300 may be the AMF network element, the SMF network element, or the terminal in the embodiments of this application.

The processor 1302 may perform various functions of the apparatus 1300 by running or executing a program stored in the memory 1301. For example, when the apparatus 1300 is the access and mobility management network element, the processor 1302 may perform, by running or executing the program stored in the memory 1301, an action completed by the AMF network element in the foregoing method embodiments. When the apparatus 1300 is the session management network element, the processor 1302 may perform, by running or executing the program stored in the memory 1301, an action completed by the SMF network element in the foregoing method embodiments. When the apparatus 1300 is the session management network element, the processor 1302 may perform, by running or executing the program stored in the memory 1301, an action completed by the terminal in the foregoing method embodiments.

The foregoing method embodiments of this application may be applied to the processor 1302, or the processor 1302 implements the steps of the foregoing method embodiments. The processor 1302 may be an integrated circuit chip and has a signal processing capability. In an implementation process, the steps of the foregoing method embodiments can be implemented using a hardware integrated logical circuit in the processor, or using instructions in a form of software. The processor 1302 may be a central processing unit (CPU), a network processor (NP), or a combination of a CPU and an NP, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and the logical block diagrams that are disclosed in this application. The general-purpose processor may be a microprocessor, or the processor may be any conventional processor or the like. The steps of the methods disclosed in this application may be directly executed and completed using a hardware decoding processor, or may be executed and completed using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps of the foregoing methods in combination with hardware of the processor. Although only one processor is shown in the figure, the apparatus may include a plurality of processors, or the processor includes a plurality of processing units. Further, the processor may be a single-core (single-CPU) processor, or may be a multi-core (multi-CPU) processor.

The memory 1301 is configured to store a computer instruction executed by the processor 1302. The memory 1301 may be a storage circuit or a memory. The memory 1301 may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver 1303 is configured to implement content exchange between the processor 1302 and another unit or network element. Further, the transceiver 1303 may be a communications interface of the apparatus, or may be a transceiver circuit or a communications unit, or may be a transceiver. The transceiver 1303 may alternatively be a communications interface or a transceiver circuit of the processor 1302. Optionally, the transceiver 1303 may be a transceiver chip. The transceiver 1303 may further include a sending unit and/or a receiving unit. In a possible implementation, the transceiver may include at least one communications interface. In another possible implementation, the transceiver may alternatively be a unit implemented in a form of software. In the embodiments of this application, the processor may interact with another unit or network element through the transceiver. For example, the processor obtains or receives content from another network element through the transceiver. If the processor and the transceiver are two physically separated components, the processor may exchange content with another unit in the apparatus without using the transceiver.

In any one of the apparatuses provided in FIG. 8 to FIG. 13 of this application, components in the apparatus are connected using a communications bus, to be specific, the processing unit (or the processor), the storage unit (or the memory), and the transceiver unit (the transceiver) communicate with each other using an internal connection path, to transfer a control and/or data signal.

An embodiment of this application further provides a communications system. The communications system may include an access and mobility management network element, a session management network element, and a terminal. In an implementation, the access and mobility management network element may be configured to perform the steps performed by the AMF network element in FIG. 3, and/or other steps described in the embodiments of this application. The session management network element may be configured to perform the steps performed by the SMF network element in FIG. 3, and/or other steps described in the embodiments of this application. The terminal may be configured to perform the steps performed by the terminal in FIG. 3, and/or other steps described in the embodiments of this application. In this implementation, "FIG. 3" may be replaced with FIG. 4A, FIG. 4B, FIG. 5, FIG. 6A, FIG. 6B, or FIG. 7.

For explanations, specific implementations, beneficial effects, and the like of related content in the communications system provided above, refer to the corresponding method embodiments above. Details are not described herein again.

It should be noted that, the access and mobility management network element above may alternatively be a chip or a system on chip on the access and mobility management network element. Similarly, the session management network element above may alternatively be a chip or a system on chip on the session management network element. The terminal above may alternatively be a chip or a system on chip on the terminal.

Methods or algorithm steps described in combination with the content disclosed in the embodiments of this application may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a mobile hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in the access and mobility management network element or the access network device. Certainly, the processor and the storage medium may exist in the access and mobility management network element or the access network device as discrete components.

In the embodiments of this application, the word "example" or "for example" is used to represent giving an example, an illustration, or a description. Any embodiment or design solution described as an "example" or "for example" in the embodiments of this application should not be explained as being more preferred or having more advantages than another embodiment or design solution. Exactly, use of the term "example" or "for example" or the like is intended to present a relative concept in a specific manner.

In the embodiments of this application, "at least one" means one or more, and "a plurality of" means two or more. The term "and/or" describes an association relationship for describing associated objects and represents that three relationships may exist. For example, A and/or B may represent the following cases: only A exists, both A and B exist, and only B exists, where A and B may be in a singular or plural form. The character "/" usually indicates an "or" relationship between the associated objects. "At least one of the following (pieces)" or a similar expression thereof means any combination of these items, including any combination of singular items (pieces) or plural items (pieces). For example, at least one (piece) of a, b, or c may represent a, b, c, a-b, a-c, b-c, or a-b-c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In the embodiments of this application, for ease of understanding, a plurality of examples is used for description. However, these examples are merely examples, but it does not mean that these examples are best implementations for implementing this application.

In the embodiments of this application, for ease of description, a request message, a response message, and names of various other messages are used. However, these messages are merely used as examples to describe content that needs to be carried or an implemented function. Specific names of the messages constitute no limitation to this application. For example, the messages may be a first message, a second message, and a third message. These messages may be specific messages, or may be some fields in the messages. These messages may alternatively represent various service operations.

A person skilled in the art should be aware that in the foregoing one or more examples, functions described in the embodiments of this application may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on the technical solutions in the embodiments of this application shall fall within the protection scope of the embodiments of this application.

What is claimed is:

1. A communications method implemented by an access and mobility management network element, wherein the communications method comprises:
receiving a first message corresponding to a packet data unit (PDU) session from a session management network element, wherein the first message comprises N1 information that is to be sent to a terminal through an N1 interface, wherein the first message does not comprise N2 information that is to be sent to an access network device through an N2 interface, and wherein the PDU session is based on a non-3rd Generation Partnership Project (non-3GPP) access;
sending a paging message to the terminal using a 3GPP access when the terminal is registered with the non-3GPP access and the 3GPP access and is in an idle state in the non-3GPP access;
receiving a service request message from the terminal in response to the paging message;
skipping sending of a PDU session update context request message to the session management network element; and
sending the N1 information to the terminal using the 3GPP access.

2. The communications method of claim 1, further comprising sending a service accept message to the terminal.

3. The communications method of claim 1, wherein the first message is a service operation message based on the PDU session.

4. The communications method of claim 1, wherein sending the N1 information to the terminal comprises sending a non-access stratum (NAS) message or NAS signaling to the terminal using the 3GPP access, and wherein the NAS message or the NAS signaling comprises the N1 information.

5. The communications method of claim 1, further comprising sending access type information corresponding to the N1 information, wherein the access and mobility management network element sends the access type information to the terminal using the 3GPP access.

6. An apparatus comprising:
a memory configured to store instructions; and
a processor coupled to the memory, wherein the processor is configured execute the instructions to cause the apparatus to:
receive a first message corresponding to a packet data unit (PDU) session from a session management network element, wherein the first message comprises N1 information that is to be sent to a terminal through an N1 interface, wherein the first message does not comprise N2 information that is to be sent to an access network device through an N2 interface, and wherein the PDU session is based on a non-3rd Generation Partnership Project (non-3GPP) access;
send a paging message to the terminal using a 3GPP access when the terminal is registered with the non-3GPP access and the 3GPP access and is in an idle state in the non-3GPP access;
receive a service request message from the terminal in response to the paging message;
skip sending of a PDU session update context request message to the session management network element; and
send the N1 information to the terminal using the 3GPP access.

7. The apparatus of claim 6, wherein the processor is configured to execute the instructions to further cause the apparatus to send a service accept message to the terminal.

8. The apparatus of claim 6, wherein the first message is a service operation message based on the PDU session.

9. The apparatus of claim 6, wherein the processor is configured to execute the instructions to further cause the apparatus to send a non-access stratum (NAS) message or NAS signaling to the terminal using the 3GPP access, and wherein the N1 information is carried in the NAS message or the NAS signaling.

10. The apparatus of claim 6, wherein the processor is configured to execute the instructions to further cause the apparatus to send access type information corresponding to the N1 information to the terminal using the 3GPP access.

11. A communications system comprising:
a session management apparatus configured to send a first message corresponding to a packet data unit (PDU) session, wherein the first message comprises N1 information that is to be sent to a terminal through an N1 interface, wherein the first message does not comprise N2 information that is to be sent to an access network device through an N2 interface, and wherein the PDU session is established based on a non-3rd Generation Partnership Project (non-3GPP) access; and
an access and mobility management apparatus configured to:
receive the first message from the session management apparatus;
send a paging message to the terminal using a 3GPP access when the terminal is registered with the non-3GPP access and a 3GPP access and is in an idle state in the non-3GPP access;
receive a service request message from the terminal in response to the paging message;
skip sending of a PDU session update context request message to the session management apparatus; and
send the N1 information to the terminal using the 3GPP access.

12. The communications system of claim 11, wherein the access and mobility management apparatus is further configured to send a service accept message to the terminal.

13. The communications system of claim 11, wherein the first message is a service operation message based on the PDU session.

14. The communications system of claim 11, wherein the access and mobility management apparatus is further configured to send a non-access stratum (NAS) message or NAS signaling to the terminal using the 3GPP access, and wherein the N1 information is carried in the NAS message or the NAS signaling.

15. The communications system of claim 11, wherein the access and mobility management apparatus is further configured to send access type information corresponding to the N1 information to the terminal using the 3GPP access.

16. A communications method, comprising:
sending, by a session management network element, a first message corresponding to a packet data unit (PDU) session to an access and mobility management network element, wherein the first message comprises N1 information that is to be sent to a terminal through an N1 interface, wherein the first message does not comprise N2 information that is to be sent to an access network device through an N2 interface, and wherein the PDU session is based on a non-3rd Generation Partnership Project (non-3GPP) access;

receiving, by the access and mobility management network element, the first message;

sending, by the access and mobility management network element, a paging message to the terminal using a 3GPP access when the terminal is registered with the non-3GPP access and the 3GPP access and is in an idle state in the non-3GPP access;

receiving, by the access and mobility management network element, a service request message from the terminal in response to the paging message;

skipping, by the access and mobility management network element, sending of a PDU session update context request message to the session management network element; and sending, by the access and mobility management network element, the N1 information to the terminal using the 3GPP access.

17. The communications method of claim 16, further comprising sending, by the access and mobility management network element, a service accept message to the terminal.

18. The communications method of claim 16, wherein the first message is a service operation message based on the PDU session.

19. The communications method of claim 16, wherein sending the N1 information to the terminal comprises sending, by the access and mobility management network element, a non-access stratum (NAS) message to the terminal using the 3GPP access, and wherein the NAS message comprises the N1 information.

20. A non-transitory computer readable storage medium configured to store instructions, which when executed by at least one processor of an apparatus, causes the apparatus to:

receive a first message corresponding to a packet data unit (PDU) session from a session management network element, wherein the first message comprises N1 information that is to be sent to a terminal through an N1 interface, wherein the first message does not comprise N2 information that is to be sent to an access network device through an N2 interface, and wherein the PDU session is based on a non-3rd Generation Partnership Project (non-3GPP) access;

send a paging message to the terminal using a 3GPP access when the terminal is registered with the non-3GPP access and the 3GPP access and is in an idle state in the non-3GPP access;

receive a service request message from the terminal in response to the paging message;

skip sending of a PDU session update context request message to the session management network element; and send the N1 information to the terminal using the 3GPP access.

* * * * *